(12) United States Patent
Weekley et al.

(10) Patent No.: US 6,735,550 B1
(45) Date of Patent: May 11, 2004

(54) FEATURE CLASSIFICATION FOR TIME SERIES DATA

(75) Inventors: Richard A. Weekley, Boulder, CO (US); Robert K. Goodrich, Boulder, CO (US); Lawrence B. Cornman, Longmont, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 10/047,311

(22) Filed: Jan. 15, 2002

Related U.S. Application Data

(60) Provisional application No. 60/262,152, filed on Jan. 16, 2001.

(51) Int. Cl.[7] .......................... G06F 15/00; F06F 17/30
(52) U.S. Cl. .............................. 702/182; 707/6; 707/7
(58) Field of Search ............................ 702/182, 189, 702/190, 167; 707/6, 7, 10, 104.1, 200, 202; 706/900

(56) References Cited

U.S. PATENT DOCUMENTS 5,940,523 A 8/1999 Cornman et al.
6,003,029 A * 12/1999 Agrawal et al. ................ 707/7
6,272,477 B1 * 8/2001 Kelly et al. ..................... 706/5

OTHER PUBLICATIONS

Cornman, Larry B.; Goodrich, Robert K.; Morse, Corinne S.; Ecklund, Warner L., "A Fuzzy Logic Method for Improved Moment Estimation from Doppler Spectra," 1998 American Meterological Society, pp. 1287–1305.

* cited by examiner

*Primary Examiner*—John Barlow
*Assistant Examiner*—Meagan S Walling
(74) *Attorney, Agent, or Firm*—Duft Setter Ollila & Bornsen LLC

(57) ABSTRACT

A processing system uses image processing technology to classify features in time series data. In atmospheric applications, the features can be used to detect outliers and/or failure modes in time series data from atmospheric measurement systems. The processing system is configured to: 1) process the time series data with a plurality of membership functions to generate a plurality of hypersurfaces, 2) process the hypersurfaces to generate a composite hypersurface, 3) process the composite hypersurface to identify clusters, and 4) process the clusters to classify the features.

27 Claims, 24 Drawing Sheets

FEATURE CLASSIFICATION FOR TIME SERIES DATA

RELATED APPLICATIONS

This patent application claims the benefit of patent application No. 60/262,152 filed Jan 16, 2001. Patent application No. 60/262,152 is hereby incorporated by reference into this patent application.

BACKGROUND OF THE INVENTION

1. Field of the Invention

The invention is related to the field of data processing, and in particular, to classifying features in time series data.

2. Statement of the Problem

The analysis of times series data plays a fundamental role in science and engineering. An important analysis step is the identification and classification of various features in the data. Quality control can be viewed as a subclass of general feature identification and classification, for example, differentiating between a true signal and a contaminating signal. Many algorithms exist for the quality control of time series data, such as Fourier or wavelet analysis, as well as robust and standard statistics. However, for other classification problems, image processing techniques have been used to great advantage. Human analysts are adept at feature identification and classification, nevertheless in many applications it is desired to have an automated algorithm that performs this role.

In time series data, the image that the analyst considers is simply a plot of the time series. Subconsciously, the analyst identifies clusters of points, correlation structures, and also uses a prioi knowledge related to the structure of features in the data. Further transformations and subsequent images of the data are often useful in performing these tasks, such as plotting on different scales and creating histograms and correlation scatter plots. Additionally, the analyst tends to think of data quality in terms of a probability, i.e. the level to which a datum is good or bad. Another important technique the analyst uses is a combination of local and global analyses. For instance, an isolated outlier in the data is easily detected by the analyst looking on a local scale. However, for numerous consecutive outliers, the analyst must consider the data over a larger scale to identify the sequence as outliers.

Typical outlier detection and quality control algorithms are Boolean in nature. That is, they indicate that a data point is either good or bad. Data points that are very bad are grouped with data points that fall just below the "good" threshold. Furthermore typical outlier detection and quality control algorithms tend to use strong a priori assumptions, and usually rely on a single test or method.

Most time series analysis methods perform on either a local or global scale. For instance, the running median is an example of a local algorithm over the scale of the median window, whereas typical histogram methods use the data over a longer time scale. FIGS. 1 and 2 illustrate how an algorithm can work well on one time scale but fail on another. FIG. 1 shows actual time series data where the instrument was failing, the top plot shows the data coded by a confidence index (high confidence to low confidence correlates respectively to circle, square, triangle, and cross). The confidence in this case was calculated using statistics from a global histogram. Notice that the data in the primary mode is given a high confidence value (circles), while the excursions from the main mode are assigned low confidence values (cross). This algorithm does a good job of flagging the most egregious outliers, but at the same time, valid peaks in the data are given low confidence values. Of course, these peaks can be given higher confidence values by changing parameters in the algorithm, however, this change would also raise the confidence of some of the outliers.

The lower plot in FIG. 1 shows the same data overlaid with a 30 point running median line. The running median does an excellent job of eliminating the outliers in the center right of the plot, however it fails for the "dropouts" in the left hand side. This results from "saturation" of the filter, i.e., when over half the window length of data are outliers.

FIG. 2 illustrates two sequences of data which have identical distributions. The upper left hand plot is simply a sigmoid function with small uniform fluctuations. The upper right hand plot is a histogram of this data. The lower left hand plot shows the data from upper left hand plot re-ordered in a random manner. Suppose a global histogram method was used on these two examples. The algorithm would correctly identify many of the points the points in the lower left hand plot as outliers, however, for the data in the upper left hand plot, many of the points would incorrectly be identified as outliers.

The National Center for Atmospheric Research (NCAR) is developing a terrain-induced wind turbulence and wind shear warning system for the aviation community in Juneau, Ak. As part of this system, pairs of anemometers are located on nearby peaks and around the runways which measure the wind every second. For operational purposes, a requirement is to produce reliable one minute averaged wind speeds, wind speed variances, wind speed peak values, and average wind directions. Since these values are updated every minute, it is possible to perform extensive calculations on the data. In general, the anemometers are highly reliable, however there are cases where the sensors make erroneous measurements. Since the mountain-top sensors are sometimes inaccessible, it is important to differentiate between good and bad data even when an instrument is failing. For example, the strong winds encountered in Juneau have been known to vibrate and then loosen the nuts holding the anemometers in place. An example data set from an anemometer exhibiting this problem is shown in FIG. 3. The actual wind speed as measured by the anemometer varies around the range of about 17 m/s. The horizontal axis is time in seconds. Data "dropouts" caused by the mechanical failure can be seen intermittently in the data, centered near 1 m/s. FIG. 4 is data for the same time interval from a second anemometer in close proximity (3 meters) to the first. As can be seen from the plots, the data dropouts are not present in FIG. 4, hence the dropouts are an artifact of a mechanical failure and not caused by turbulent structures in the wind.

Other failure modes can be caused by icing of the anemometer or shielding from certain wind directions by ice build-up. Furthermore, it is known from video footage that certain wind frequencies excite normal modes of the wind direction head and can cause the device to spin uncontrollably. Data from such a case can be seen in FIG. 5 where the vertical axis is wind direction measured in a clockwise direction from North. The horizontal axis is again time measured in seconds. Between about 500 seconds and 1000 seconds the wind direction measuring device is spinning and the data becomes essentially a random sample of a uniform distribution between about 50 degrees to 360 degrees. The true wind direction is seen as an intermittent data at about 225 degrees, which is in general agreement with the value from the nearby anemometer. FIG. 6 shows the wind direction at another time distinct from that in FIG. 5, where in this example, the true wind direction is around 40 degrees. Notice the suspicious streaks in the time series data near 200 degrees.

In the context of these anemometer examples, the crux of the quality control problem is to determine which data points are "bad" (not part of the atmospheric data) and which data points are "good" (part of the atmospheric data). Separating the good data from the bad can be especially difficult when some bad data points have characteristics of good points. For example, during an episode of highly changing, gusty winds there may be sensor problems that manifest in a way that are similar to valid wind gusts, such as some of the dropout data in FIG. 3. Consequently the problem is to identify the suspect data without mislabeling similar looking good data.

Time series algorithms such as Auto-Regressive Moving Average (ARMA) may be used to remove isolated outliers in stationary data. Data are used to compute model coefficients and variance estimates, if the point in question is a large distance from the model prediction in terms of the estimated variance, such a point may be called an outlier. A similar technique is the least square adaptive polynomial algorithm (LSAP) or discounted least squares. For data containing more than isolated outliers, it is necessary to use so-called robust techniques to compute the model parameters. This is because numerous outliers may cause a large error in the parameter estimates and an ARMA method for finding outliers could break down. These robust techniques are much less sensitive to numerous outliers in the data. However even robust methods have what are called breakdown points. For example, if a running median is applied to the data, and more than 50% of the data are outliers this robust technique could fail. There are other robust techniques, but if a long string of data contains only outliers, for instance when a sensor fails, even a sophisticated technique may fail. Since there are cases in the Juneau data where the assumptions inherent in the aforementioned techniques are violated, a new method is required to correctly quality control these time series data.

A powerful tool for this integration of indicators is fuzzy logic. When creating a fuzzy logic algorithm, the developer must determine what characteristics and rules a human expert might use to categorize the data. These characteristics, or indicators, which are either calculated or measured directly from the data are input fields for the membership functions. The membership functions return a membership value, in fact the membership functions rescale the input fields to a common sale so they can be combined effectively by the fuzzy rules. The fuzzy rules are a set of conditional statements that assign a final output value to a fuzzy algorithm given a certain set of input values. Suppose that a fuzzy logic algorithm requires two inputs A and B. A fuzzy rule for this hypothetical algorithm could be: "when membership value A is large and membership value B is small then the output is large." Additionally there are other methods that can be used to combine the membership.

A similar method to that outlined above, the NCAR Improved Moments Algorithm (NIMA), has been used to find the atmospheric signal in Doppler wind profiler spectra. A wind profiler is a vertically pointing radar that measures Doppler spectra as a function of range. The spectra indicates the distribution of returned power (vertical axis) as a function of Doppler velocity (horizontal axis). These spectra can be plotted (in log scale) one atop another as shown in FIG. 7. This representation of the data is referred to as a stacked spectra or waterfall plot. The first spectral plot is shown in the bottom left and continues as a function of range up the left column then starts again at the bottom of the right column and continues to the top of that column. Notice the bimodal signal starting at 1127 meters and continuing through 2062 meters. The signal near zero velocity is from a contaminant (ground clutter from nearby mountains) and the signal centered around +6 m/s is the atmospheric signal. FIG. 8 is a contour plot of the stacked spectra or profiler map, (the contour lines represent the log magnitude of the spectra). It is often difficult to grasp the structure of the total signal by looking at the stacked spectra. On the other hand, the profiler contour map more readily reveals the essential visual characteristics of the data to the human analyst. While the data is identical in the stacked spectra and the profiler map, it is clear that the method chosen to render the data is important. It is important to note that the NIMA algorithm was tried on the time series data. However, as with any algorithm, many assumptions were made about the behavior of the data in the development of NIMA, that are contrary to the typical behavior of time series data.

Suppose the data from FIG. 3 is broken into overlapping sub regions using a sequence of running windows. For each data window, an estimate of the probability density function (i.e. a normalized histogram) is calculated. This sequence of histograms can be stacked (FIG. 9) as was done for the profiler spectra. Where the histograms for the first time window is shown in the bottom left, the plots then run up the left column as a function of time and continue from the bottom right plot to the top right plot (the stacked histograms are shown for only the time range that includes the first 555 data points from FIG. 3). Notice that, in this case the mode associated with the atmospheric data (on the right-hand side) and the data associated with the dropouts (on the left-hand side) are well-separated. A more natural way to plot the stacked histograms might be to plot them across the page, that is, as a function of time (imagine turning FIG. 8 on its side).

These stacked histograms can then be plotted as a contour image (FIG. 10), and is called the histogram field. The contour plot in FIG. 10 represents a hypersurface, where the contour lines represent the height of the hypersurface above each point in the time-wind speed plane. As in the case of the profiler, plotting the stacked histograms as a contour image emphasizes the structure inherent in the stacked histograms, i.e. shows the local continuity in the data—as expected for most time series.

It is natural for a human analyst to look at FIG. 10 and see that there are large clumps (peak regions). Notice though that these clumps do not contain all the data points in the original time series, i.e., there is cluster data and non-cluster data. By inspection the analyst can easily combine these local clusters into larger scale features. For instance in FIG. 10, a human expert might group the large clusters centered around 17 m/s into a feature and the others near 1 m/s into a second feature.

SUMMARY OF THE SOLUTION

The invention helps solve the above problems by using image processing technology to classify features in time series data. In atmospheric examples of the in, the features can be used to detect outliers in the time series data from weather measurement systems. The invention may also be implemented in numerous other areas, such as image recognition and computer-generated video.

Examples of the invention include systems, methods, and software products to classify a feature in time series data. The systems include a processing system and an interface where the interface receives the time series data. The method is for operating a processing system. The software product includes a storage system that stores application software that directs a processing system.

In some examples of the invention, the processing system is configured to: 1) process the time series data with a plurality of membership functions to generate a plurality of hypersurfaces, 2) process the hypersurfaces to generate a composite hypersurface, 3) process the composite hypersurface to identify clusters, and 4) process the clusters to classify the feature.

In some examples of the invention, the processing system is configured to contour the composite hypersurface to form the clusters.

In some examples of the invention, the processing system is configured to classify the clusters based on a plurality of cluster types, such as an atmospheric cluster type and/or a failure mode cluster type.

In some examples of the invention, the processing system is configured to construct the feature from the clusters based on the cluster classifications.

In some examples of the invention, the processing system is configured to calculate feature membership values for the time series data based on the classified feature and to detect outliers in the time series data based the feature membership values.

In some examples of the invention, the hypersurfaces and/or the composite hypersurface have a height scale from zero to one.

In some examples of the invention, one of the hypersurfaces indicates confidence values for the time series data.

In some examples of the invention, the processing system is configured to process one of the hypersurfaces to identify additional ones of the clusters.

In some examples of the invention, the processing system is configured to: 1) process the time series data with a membership function to generate a hypersurface, 2) process the hypersurface to identify a cluster, and 3) process the cluster to classify the feature.

DESCRIPTION OF THE DRAWINGS

The same reference number represents the same element on all drawings.

DETAILED DESCRIPTION OF THE INVENTION

Figure 1:
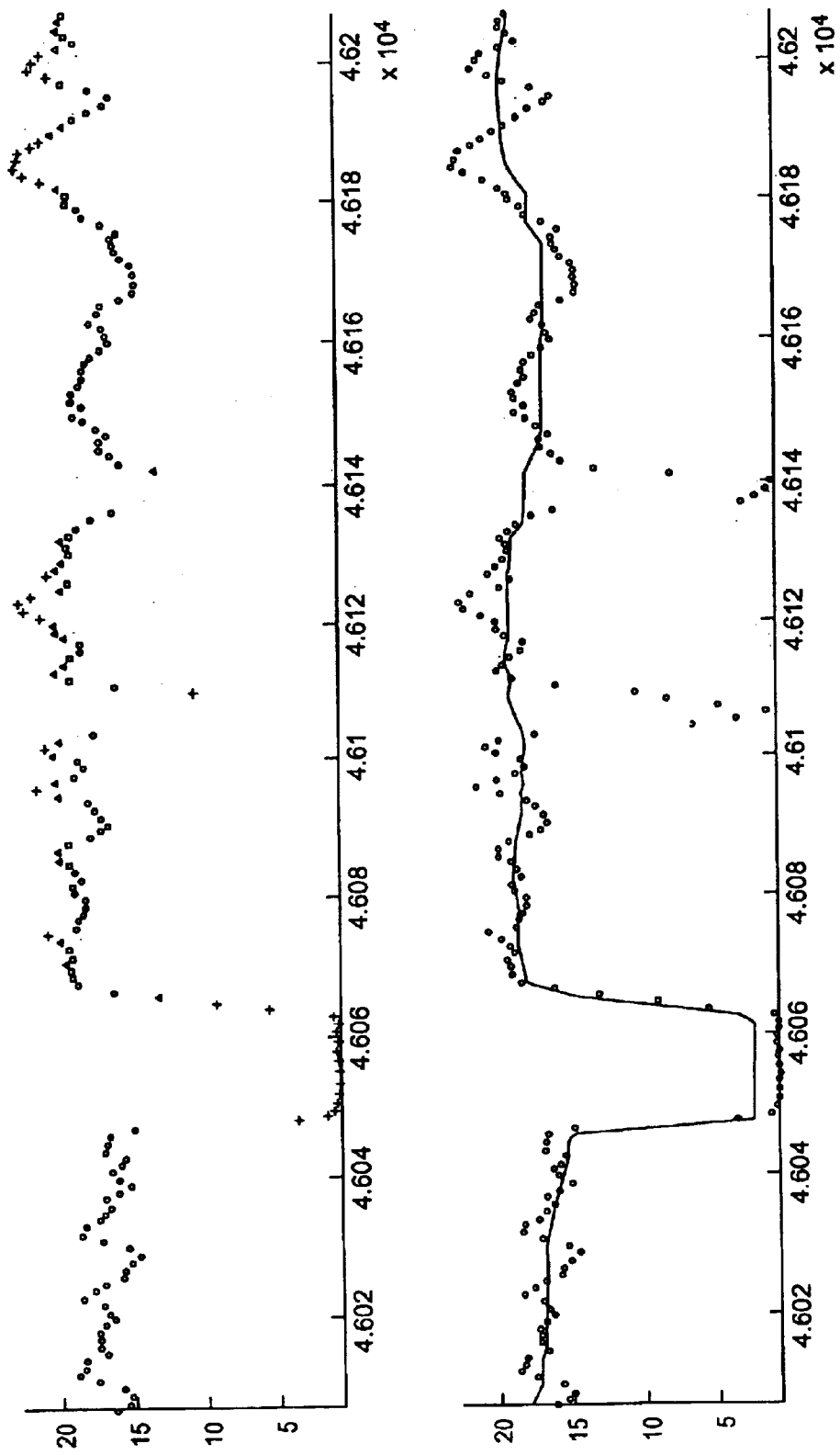
FIG. 1 illustrates time series data points in an example of the prior art.
Figure 2:
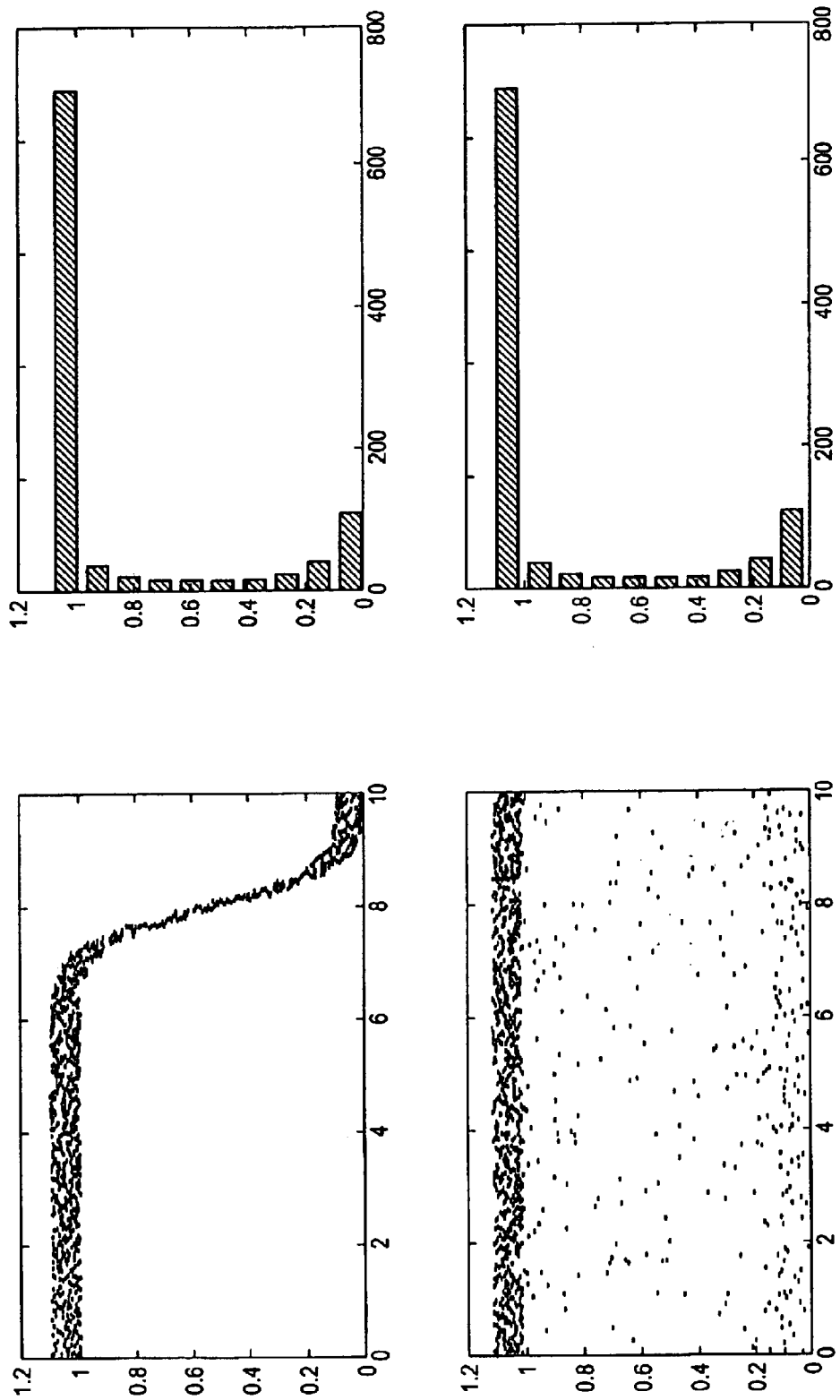
FIG. 2 illustrates data points with identical distributions in an example of the prior art.

FIGS. 11–24 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Intelligent Outlier Detection Algorithm

The above considerations have indicated the need for the development of a fuzzy logic, machine intelligent algorithm that mimics the feature classification and identification processing of the human analyst. In the following, a description of such an algorithm, the Intelligent Outlier Detection Algorithm (IODA), is presented. This algorithm incorporates cluster analysis, fuzzy image processing, local and global analysis, correlation structure, as well as a priori knowledge when available. IODA returns a quality control index (confidence value) between 0 and 1 that indicates the reliability of the data. In cases where there are a large number of outliers—a situation that is problematic to most algorithms—this algorithm is able to identify a majority of the desired signal as well as the outliers. Furthermore the algorithm has broader application than to time series analysis, such as the analysis of a sequence of spatial images.

The methodology of IODA is general enough to account for quality control problems found in a wide variety of data types—not simply anemometer data. IODA relies on image processing and fuzzy logic techniques. The general concept is to break the image down into sub-regions, within which a variety of analyses are performed. These analysis include, cluster analyses, continuity tests, standard methods, among others. Each of these calculations are intended to parallel the subconscious processing of the human analyst. A multi-scale approach to the sub-region calculations can then be employed to provide a local/global perspective, again as a human analyst might. Each of the indicators—on the various scales—provide useful information, but in general, they will not individually provide enough information regarding the data quality. In fact for certain data, some of the indicators may provide conflicting information. This was seen in the above mentioned examples, i.e. with the median filter and the global histogram. Therefore a relative large number of quasi-independent tests are desired to resolve contradictions. For example, if eight out of ten indicators are giving consistent information regarding a given point's quality, then the probability that this is the correct result is increased.

A useful quality control metric is a confidence value that indicates the degree to which the data is good or bad (e.g., a value in a range of 0 and 1). Depending on the application, the confidence value may be used directly (e.g., with a confidence-weighted running mean) or a threshold for the confidence value can be chosen to define an outlier (e.g., data whose confidence is below 0.3 might be termed outliers). The specific value chosen for the threshold can vary depending on the application, for critical applications a higher threshold might be used to eliminate all possible outliers, while in other circumstances a lower threshold may be preferable.

In actuality there are three tasks at hand: characterize/categorize the clusters, group the clusters into features and characterize/categorize the non-cluster data. For example, in this case there are three cluster categories, atmospheric clusters, frozen clusters, and spurious clusters, as well as a non-cluster data category. Atmospheric clusters contain points with the expected auto correlation structure, frozen clusters are clusters that form around flat segments of data and spurious clusters are clusters that form around random groupings of data. The notion of atmospheric, frozen and spurious clusters, as well as non-cluster data are quantified using fuzzy logic algorithms.

Figure 3:
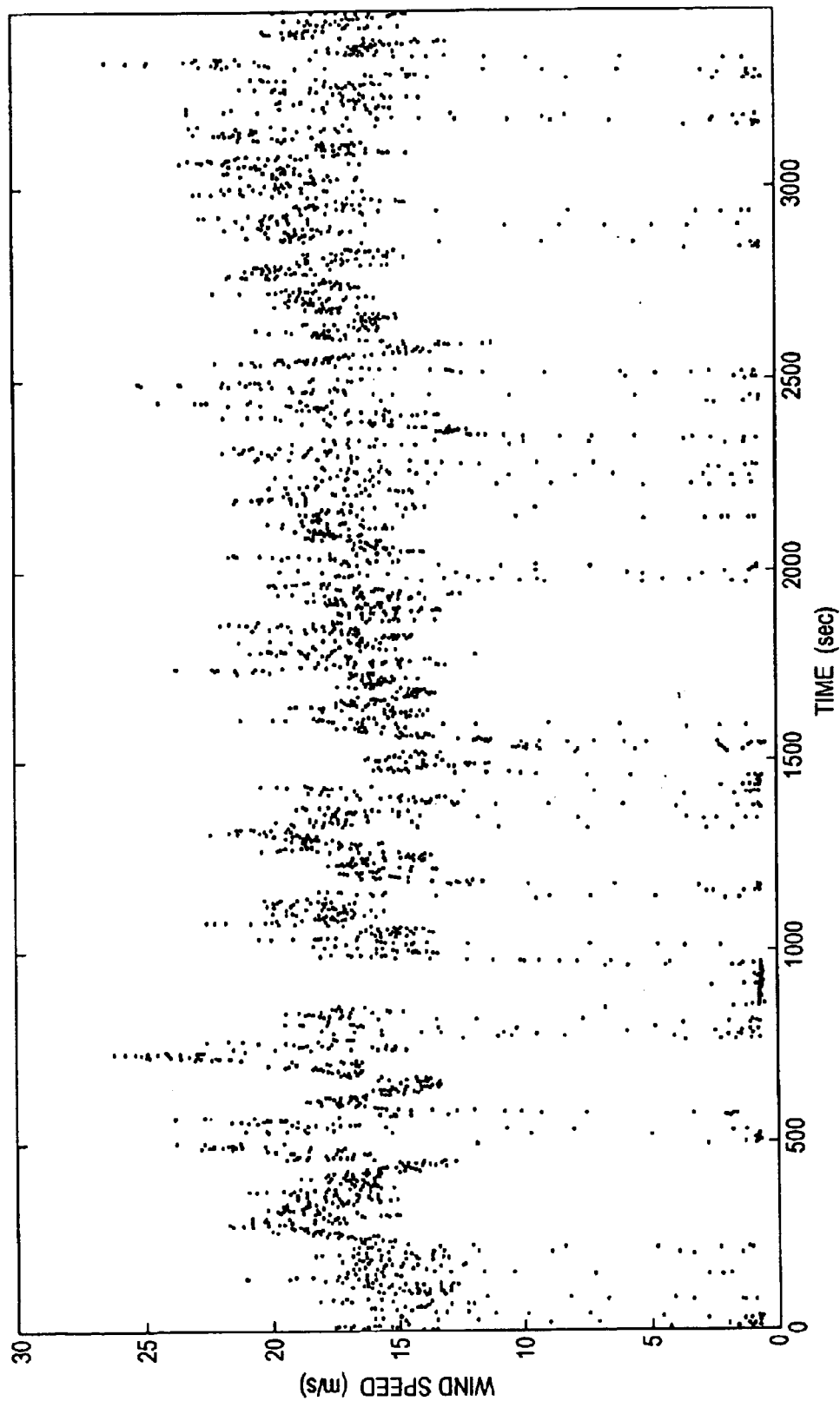
FIG. 3 illustrates anemometer data points in an example of the prior art.
Figure 4:
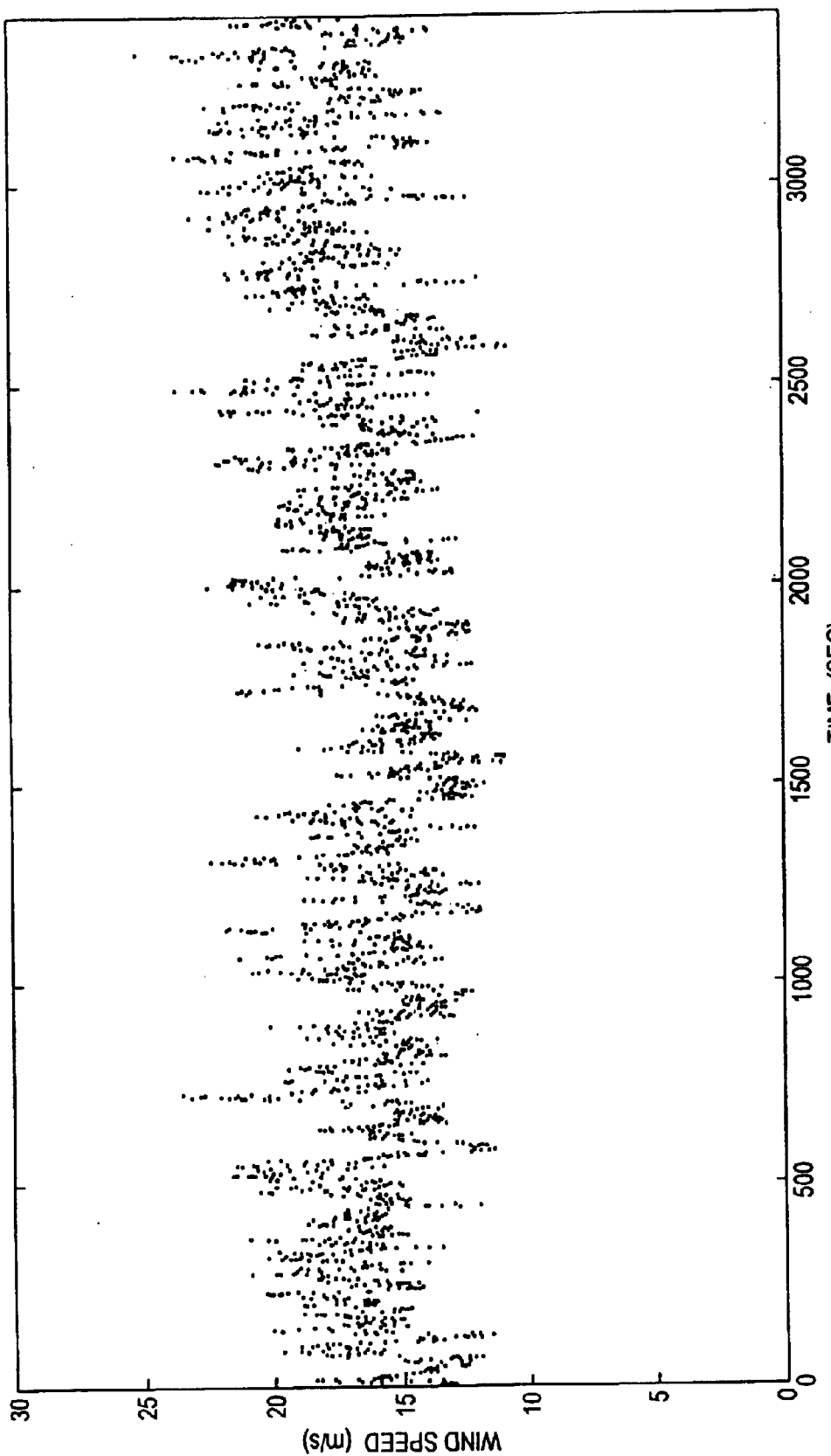
FIG. 4 illustrates anemometer data points in an example of the prior art.
Figure 10:
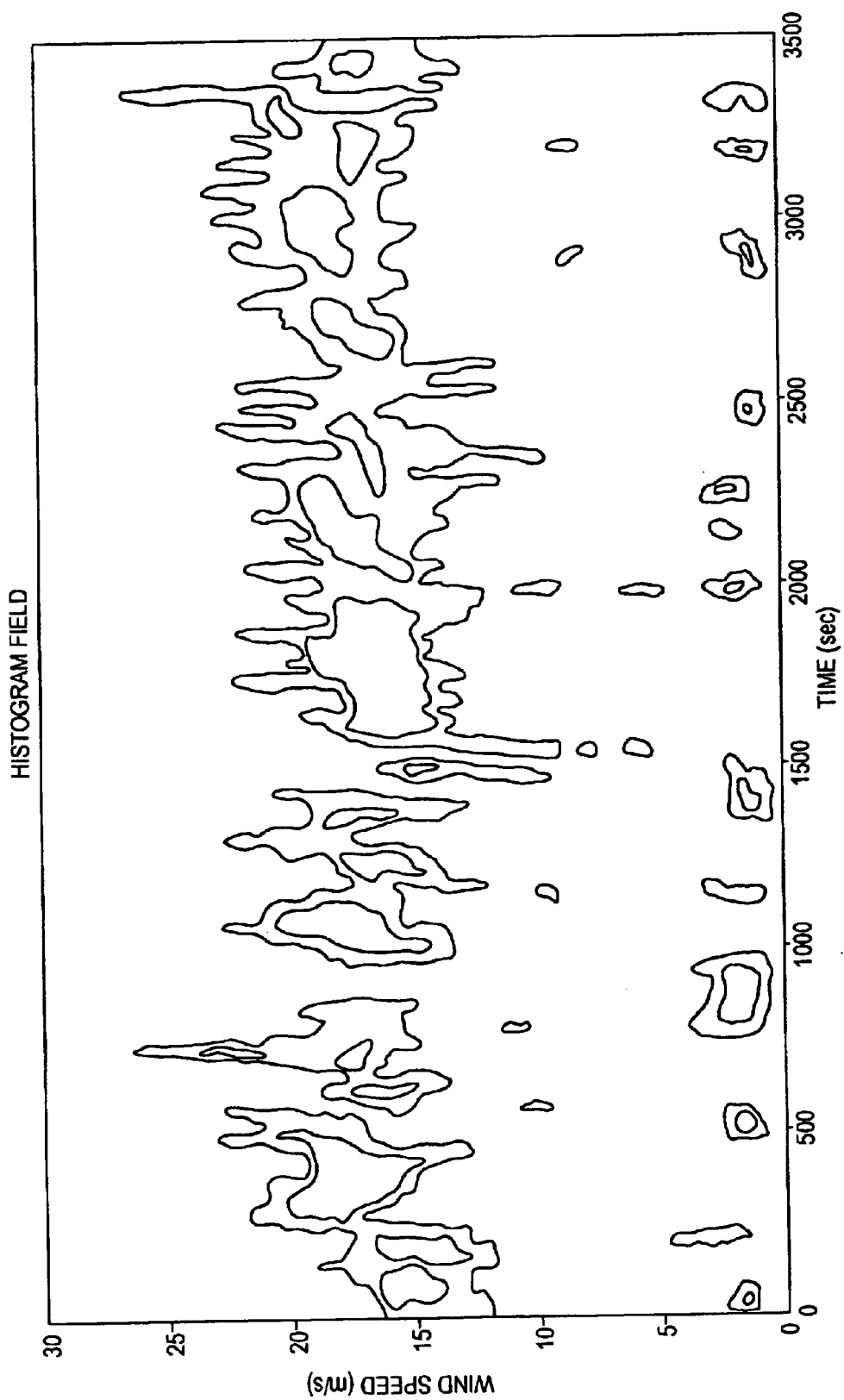
FIG. 10 illustrates a histogram field in an example of the prior art.
Figure 11:
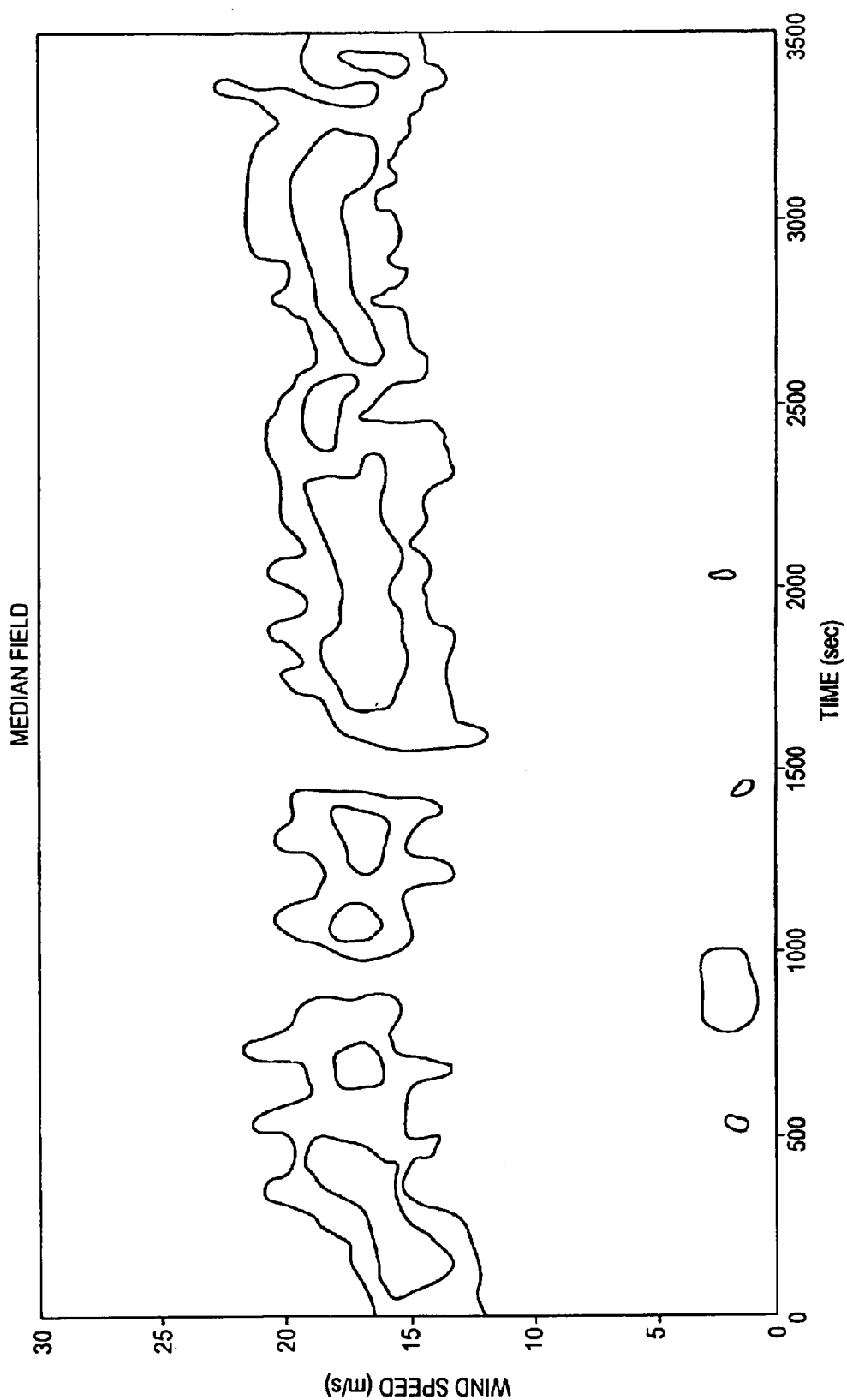
FIG. 11 illustrates a median field in an example of the invention.

A histogram field is one example a mapping of the time series data using a membership function—referred to as a hypersurface. As mentioned above the histogram field is found by creating a contour image of stacked histograms. A second field is found by applying a two dimensional median filter to the histogram field, called the median field. The median field is another example of a hypersurface. Here the median filter of the image is calculated over small overlapping rectangles in the time-wind speed plane. The median value for the rectangle is calculated and ascribed to the center coordinate of the rectangle. The median filter of FIG. 10 is shown in FIG. 11. Notice there are fewer small peak regions near the bottom of FIG. 11 than in FIG. 10, since they are small isolated regions of high histogram values. Furthermore many of the points between the atmospheric data and the dropout points of FIG. 3 are in the lower regions of FIG. 11.

Figure 13:
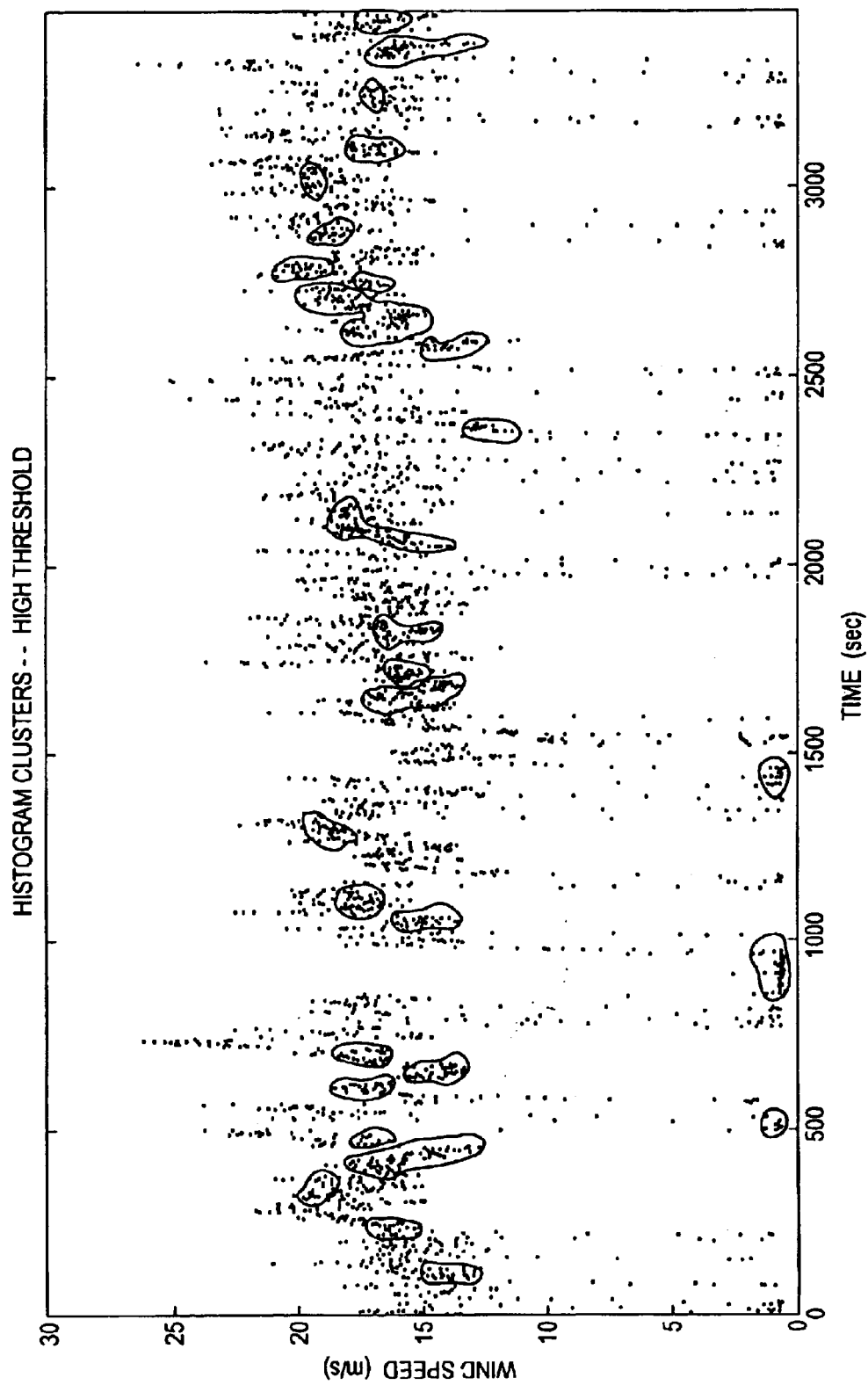
FIG. 13 illustrates clusters in an example of the invention.
Figure 14:
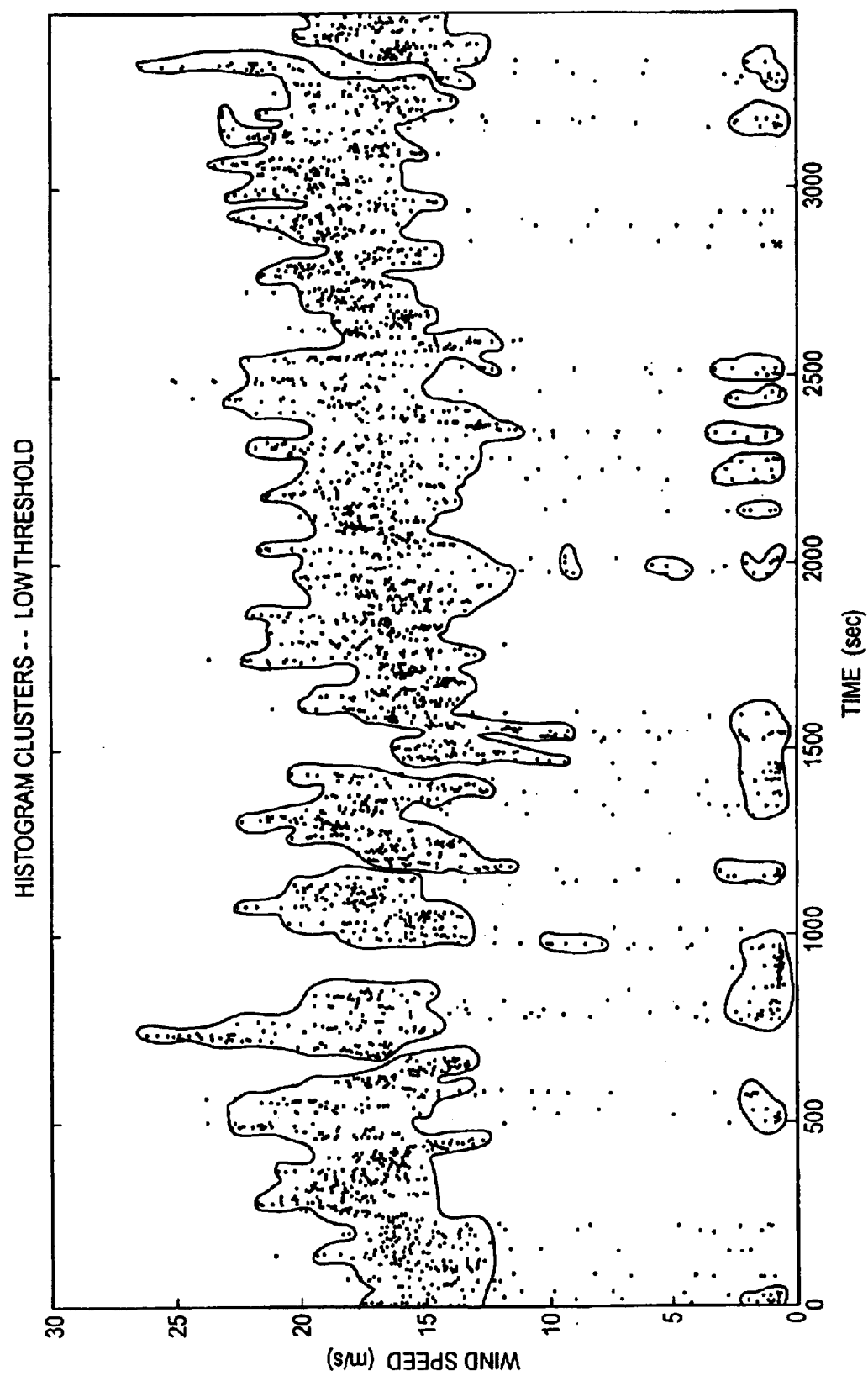
FIG. 14 illustrates clusters in an example of the invention.
Figure 15:
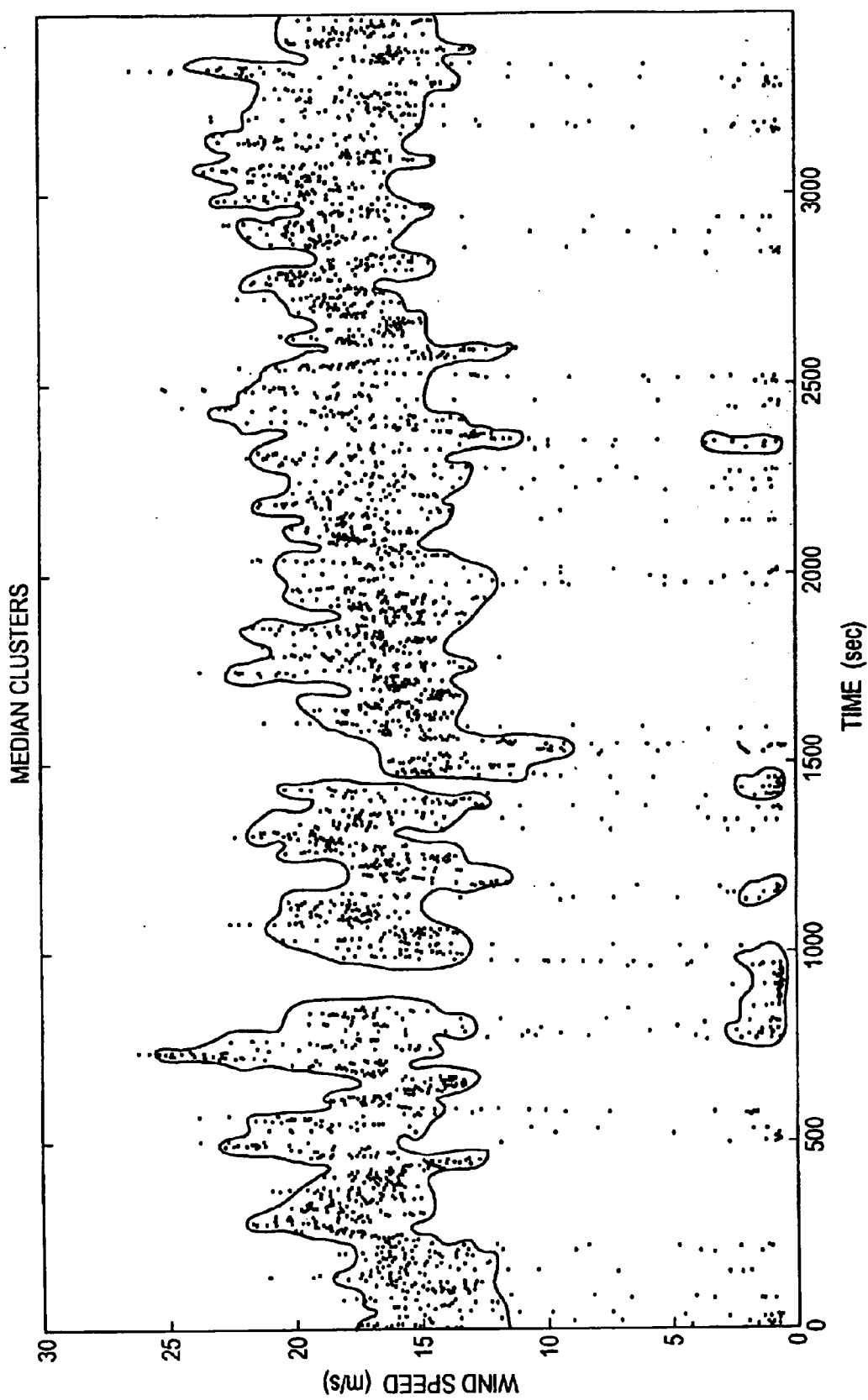
FIG. 15 illustrates clusters in an example of the invention.

Part of the ability for a human expert to find good and bad data is the ability to cluster data into larger scale structures. The human expert then characterizes these larger regions according to a set of rules, e.g., what is the correlation of the data in the cluster. Similar clusters in the time series data can be found from both the histogram and median field. Consider the peaks regions in both FIG. 11 and FIG. 10. These peak regions of both the histogram and median fields can be encircled using a contour algorithm to define concentrations or clusters of points as shown in FIG. 13 where the cluster boundaries that surround the data points of the cluster are indicated by the enclosure lines. Histogram clusters are the clusters found in the histogram field, likewise median clusters are found in the median field. If a lower threshold value is picked then the regions will grow in size and might look something like the clusters shown in FIG. 14. A sequence of clusters can be found by incrementally lowering the contour threshold, or by "lowering the water." This expression is related to the idea that the contour is a set of mountain peaks and the threshold level represents a water level. As the level is lowered, the peaks become connected by ridge lines. FIG. 14 is in fact the lowest such water level for the histogram field, whereas FIG. 15 is the lowest water level clusters for the median field. Notice in FIG. 14 that several new clusters have appeared, and other clusters have grown and joined together. These clusters can either be combined into features or they can be separated into smaller clusters.

As noted earlier, there are points which may not belong to clusters, or non-cluster points. These usually fall into one of several categories, they can be isolated points that are somewhat removed from the bulk of the signal. Data peaks are a good example of these types of data points, or data that falls between two clusters. Both these cases are examples of non-cluster points that are good. However there are cases where the non-cluster points are bad, as in the case of uniform background noise. Consequently it is desired to have an algorithm that will correctly assign a confidence to the non-cluster points. The difficulty however is that in the case where the data points are good, i.e. isolated peak points, or isolated points between two clusters. There is usually not enough data to build a robust indicator or fuzzy field. However in the case of background noise there is usually enough data to develop a robust statistical test. Hence the strategy is to reduce the confidence in the non-cluster points if a background distribution is found.

Figure 5:
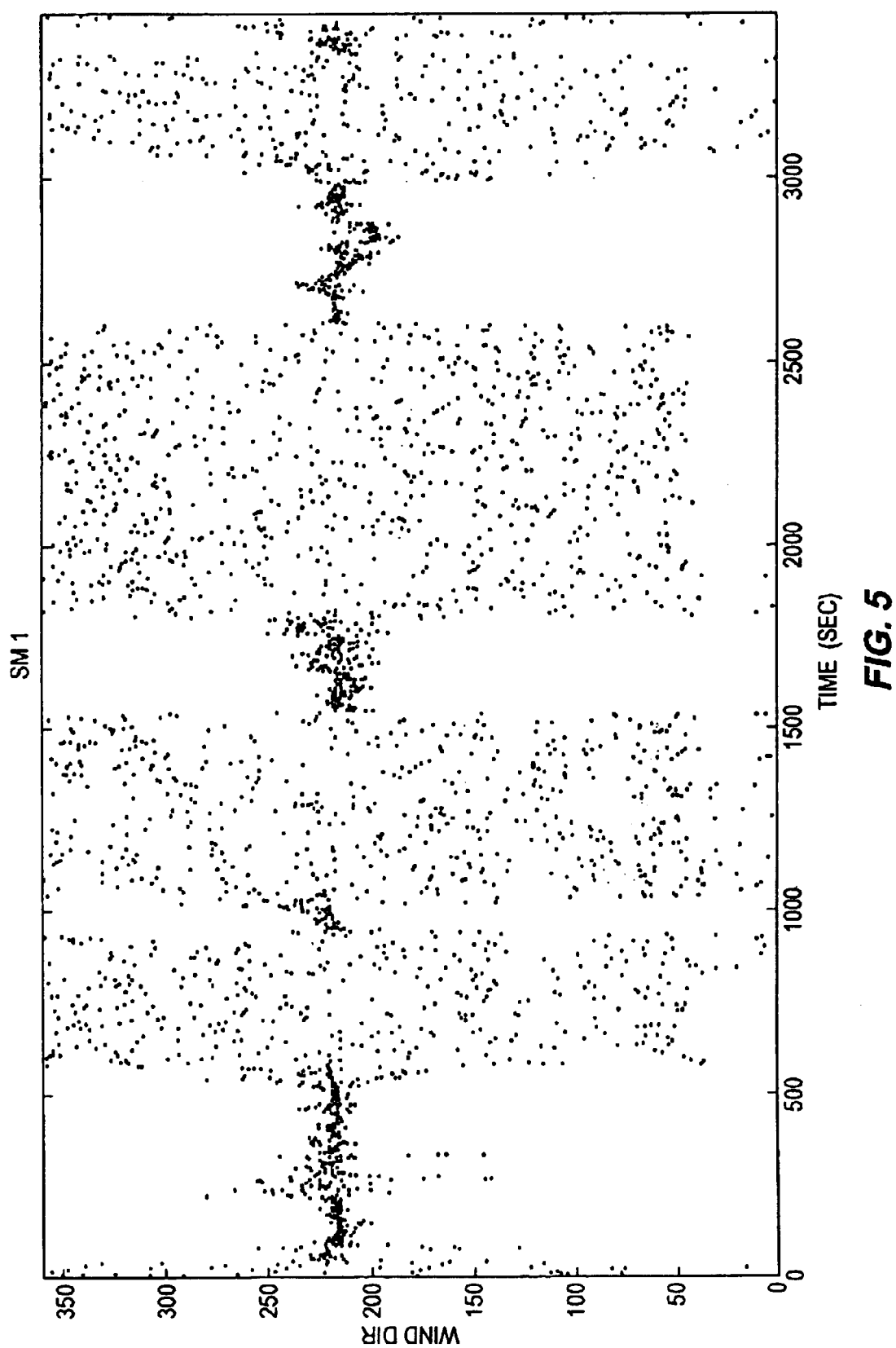
FIG. 5 illustrates wind direction data points in an example of the prior art.
Figure 12:
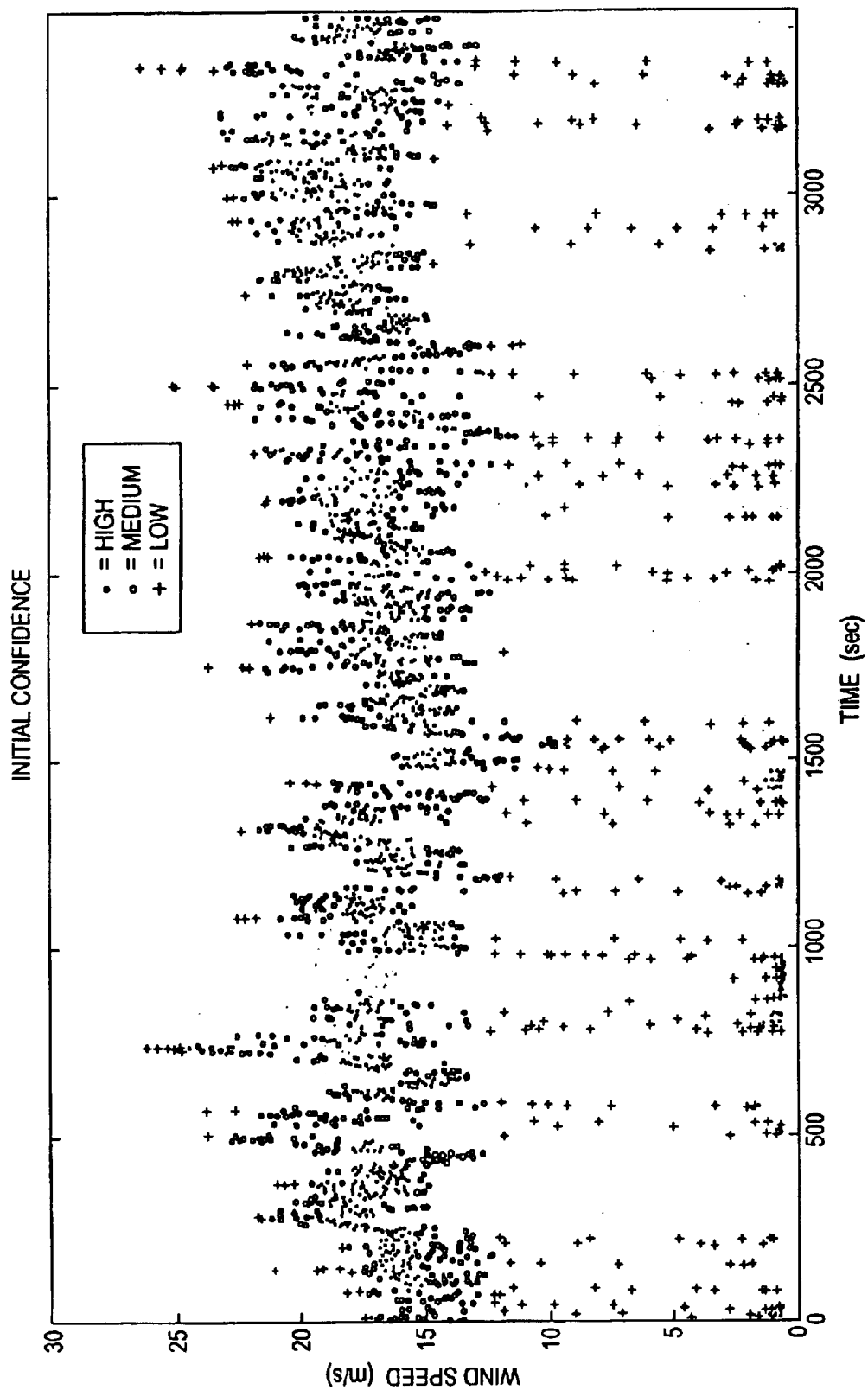
FIG. 12 illustrates initial confidence values in an example of the invention.

In the case of background noise there will be a large number of points which do not belong to clusters, since these points do not have a high enough density to form clusters. A membership value can be calculated for each point in the time series from the histogram and median fields. FIG. 12 shows the initial confidence estimates that are the average of these two scores. On FIG. 12, dots have a high confidence, circles have a medium confidence, and crosses have a low confidence. Those skilled in the art will appreciate that more granular representations than FIG. 12 are available by using color coding based on confidence. The initial confidence implicitly contains information about the local distribution of data surrounding a point, i.e., if a point has a low initial confidence then it was in a region of sparse data. In fact the initial confidence can be thought of as a cluster membership value. Recall to find clusters a threshold was set and a contour algorithm was applied to both the median and histogram fields, consequently if a point has a low initial confidence then it belongs to a cluster only at a very low water level. The confidence information then is a natural indicator to find trends (i.e. background distributions) in the non-cluster data, or data with a low initial confidence. Unfortunately the data in FIG. 12 is not a good example of uniform background noise. However if this same sequence of calculations were performed for the data shown in FIG. 5 the block of uniform data will have a low initial confidence, since the points are not as dense as the true time series data. The uniform noise in the data is found by taking points below a confidence threshold and testing to determine if the points are consistent with a background distribution using a fuzzy logic algorithm. If a confidence threshold is found where the points are consistent with a background distribution, then the points below the confidence threshold are given a high background membership value. This can also be thought of as a "noise" hypersurface.

Figure 6:
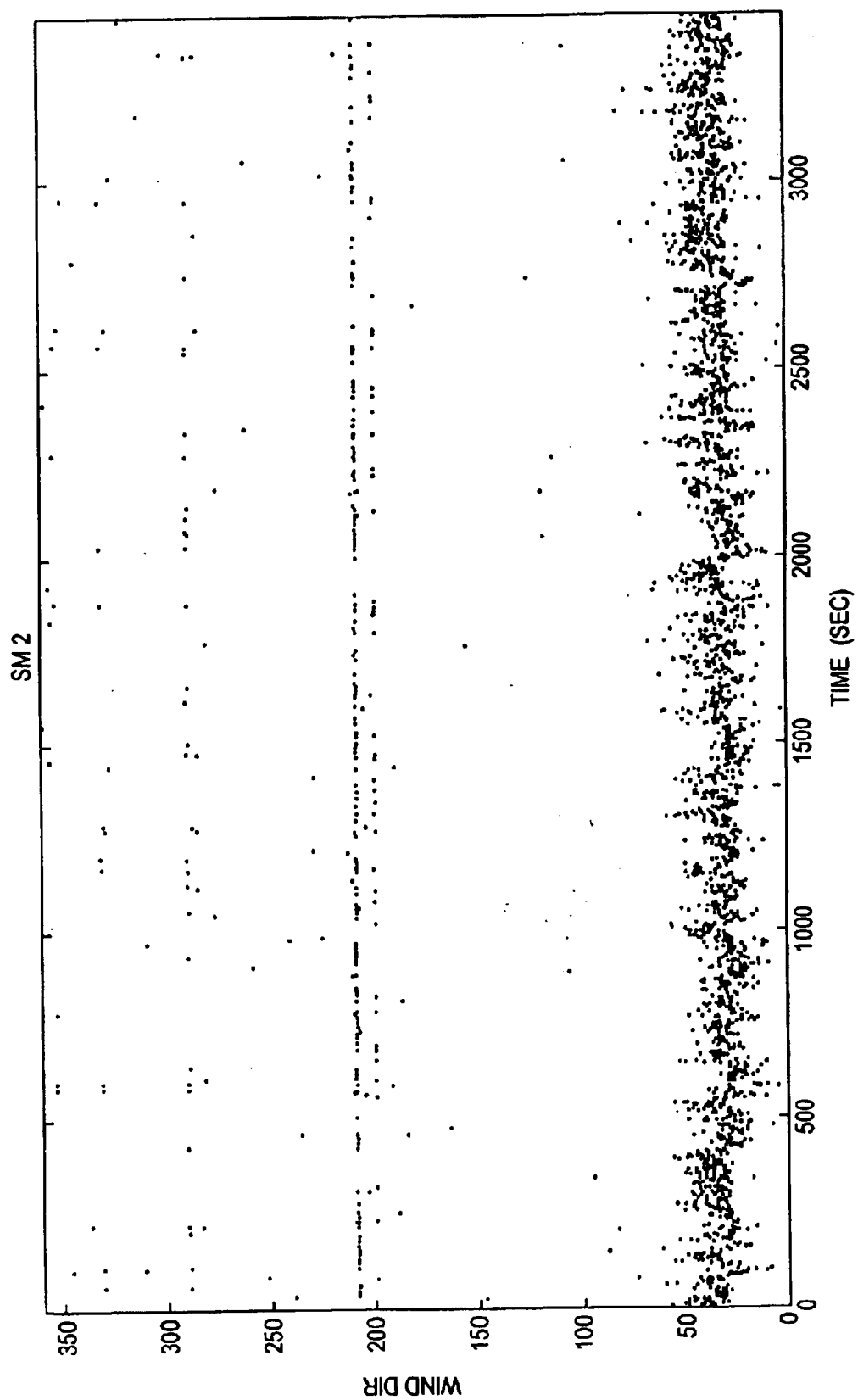
FIG. 6 illustrates wind direction data points in an example of the prior art.
Figure 7:
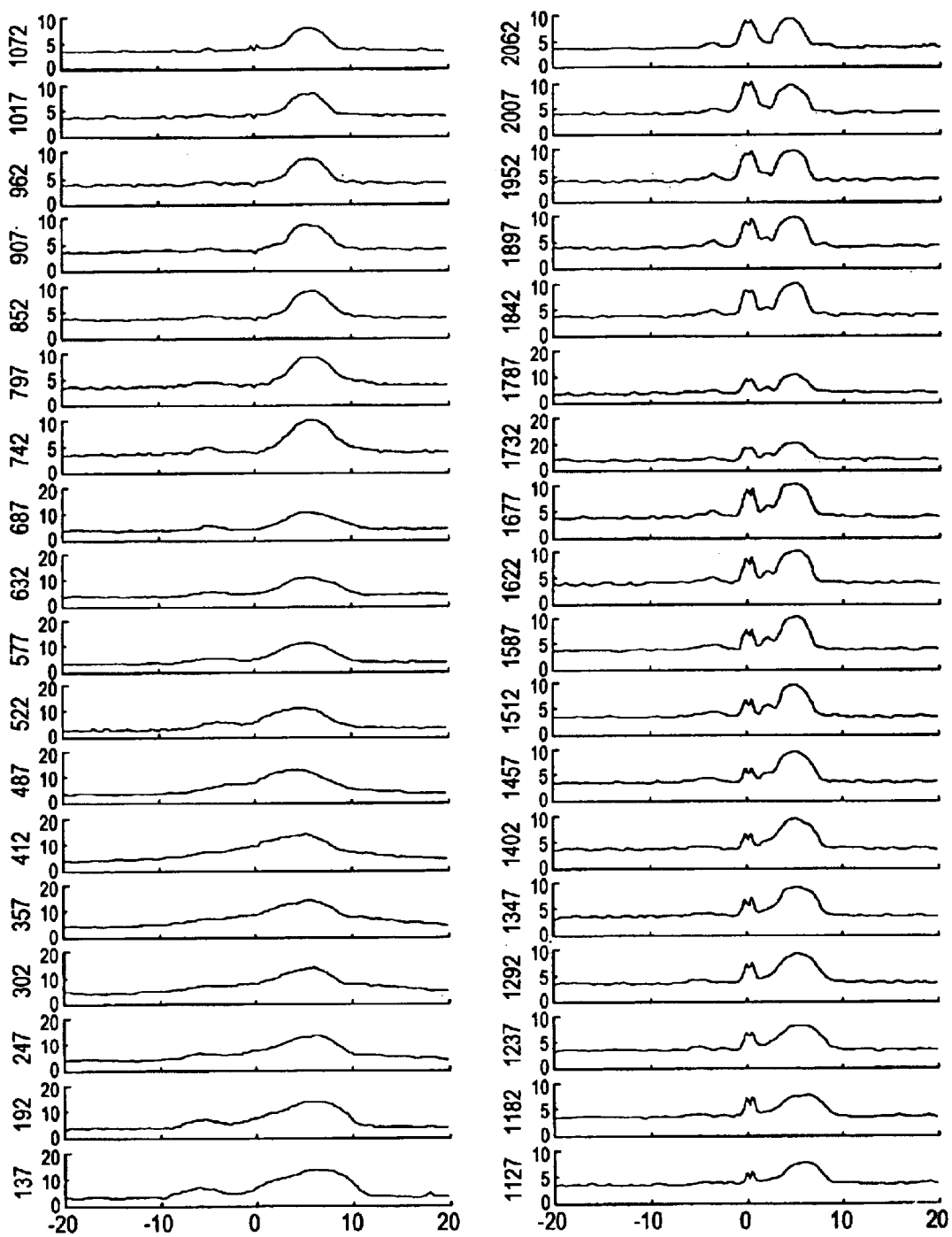
FIG. 7 illustrates stacked spectra in an example of the prior art.
Figure 8:
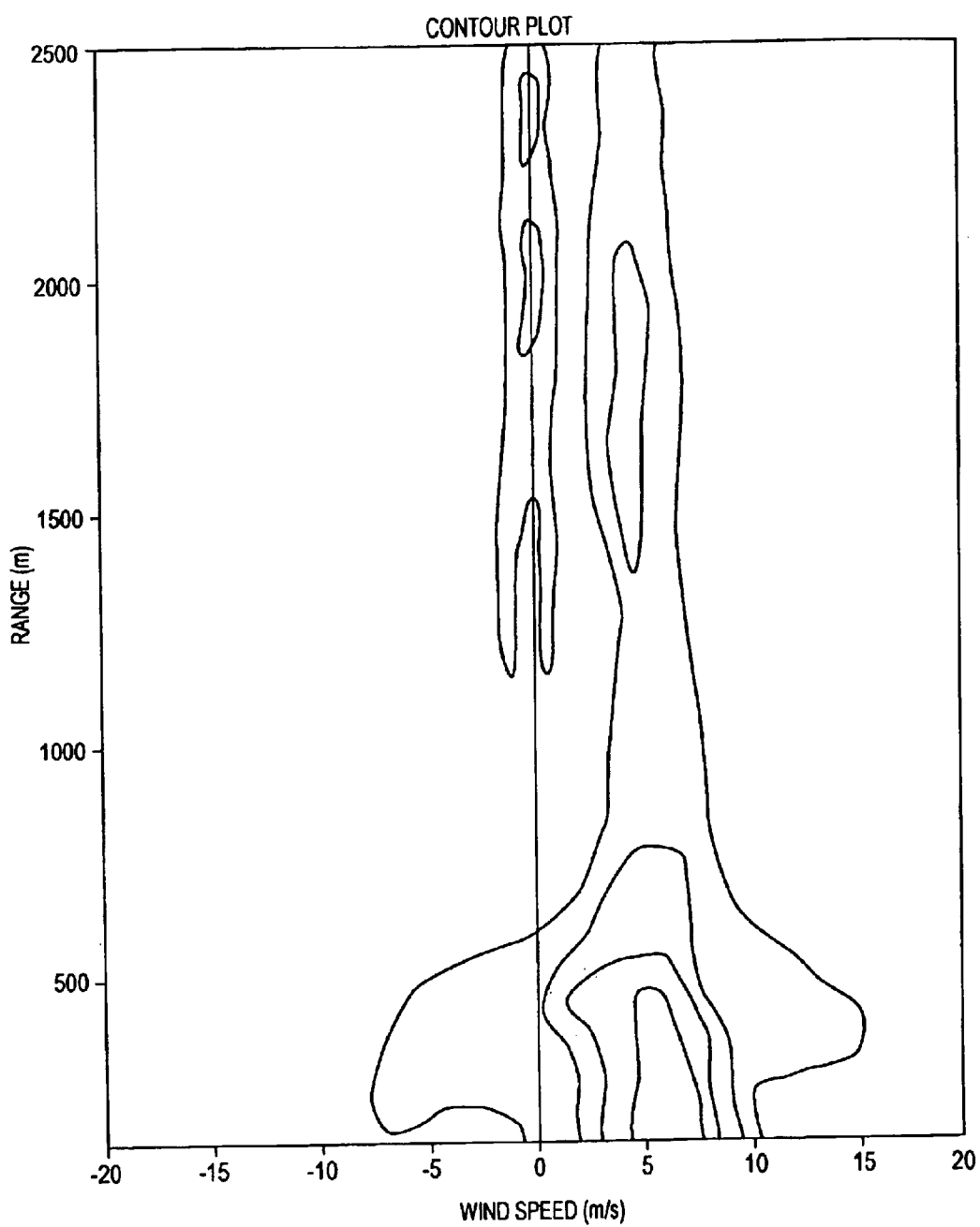
FIG. 8 illustrates a contour plot in an example of the prior art.
Figure 9:
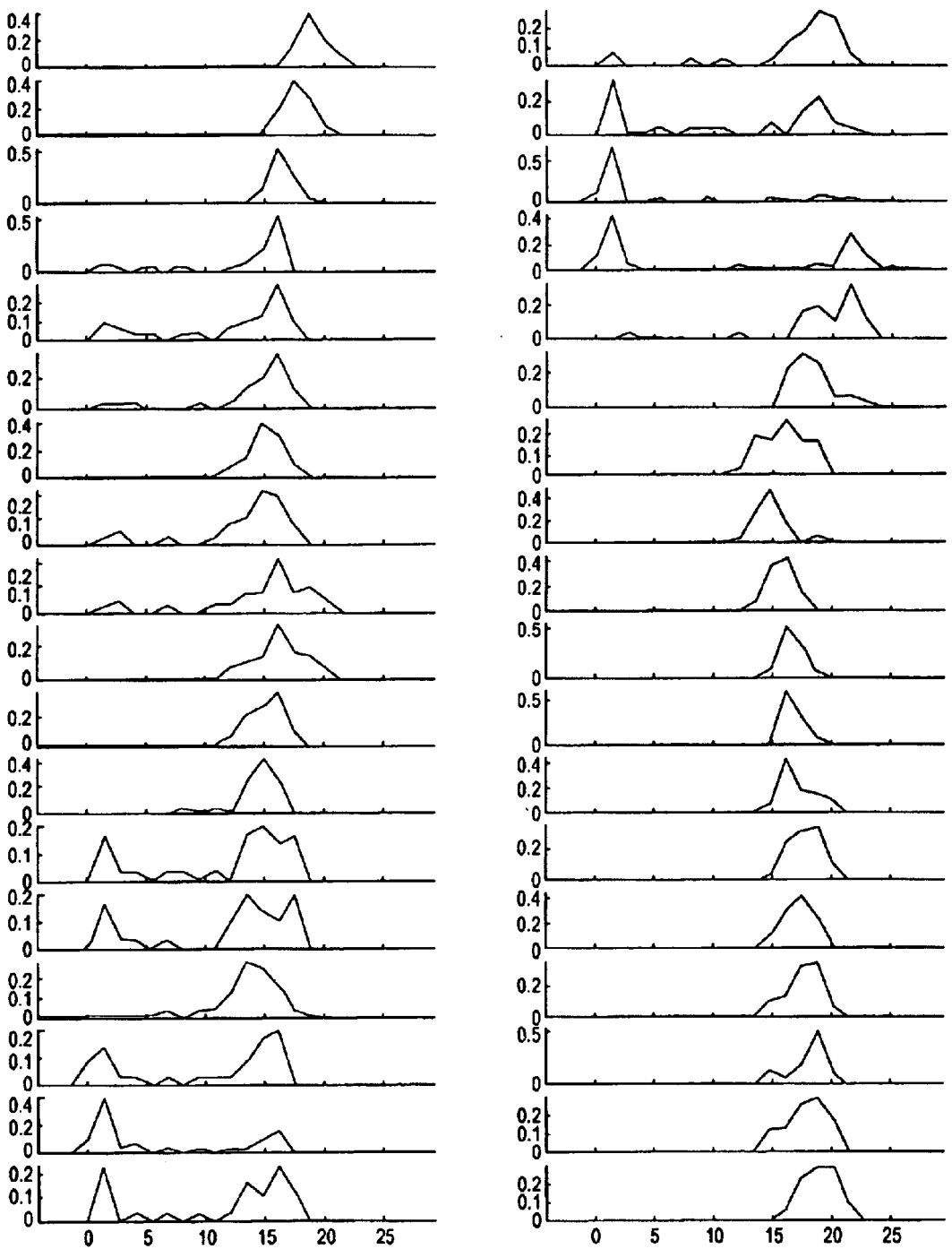
FIG. 9 illustrates stacked histograms in an example of the prior art.

In general, clusters found using the above techniques will, by definition, group similar data structures together. In fact, to find a feature the data in each cluster must be tested to see if it is consistent with for nominal sensor data. Similarly, it is possible to see if a cluster is consistent with a known problem or failure mode such as a loose nut. However, in order to determine if a cluster is consistent with a failure mode, the cluster types for the specific failure modes of an instrument must be characterized. In Juneau, comparisons were made between pairs of nearby anemometers to find failure modes. In the case of anemometer data from Juneau, at least two quality control problems have been observed. Data dropouts which manifest as flat, or frozen clusters (such as in FIG. 6 at about 210 degrees) and uniformly distributed data (such as in FIG. 5). Frozen clusters are found simply by finding how well a set of straight line fits the data in a given cluster. This is an example where the cluster type is a correlation to a geometric constraint. The second failure mode, background data, is modeled by finding the spurious clusters that form around random groupings of data.

Consider a uniform distribution of data locally there will be concentrations of points in the data. These concentrations of points create spurious clusters, and are found by considering whether points belong to clusters in both the histogram field and the median field. Specifically a critical skill index (CSI) is calculated for each cluster. The CSI cluster membership value is calculated by finding the number of points that occur in both the histogram clusters and the median clusters. FIG. 15 is a plot of the clusters for the lowest water level of the median field for the data in FIG. 3. Notice that most of the small clusters that appear in the histogram field at the lowest water level (FIG. 14) are gone. This is a result of the median filter which tends to remove spurious data. If a point occurs in both the histogram field cluster and the median field cluster then such a point is called a hit, and it is more likely to be a good point. The CSI for a cluster is simply:

$$CSI = \frac{HITS}{N}$$

Where N is the number of points in the union of the two clusters.

Figure 16:
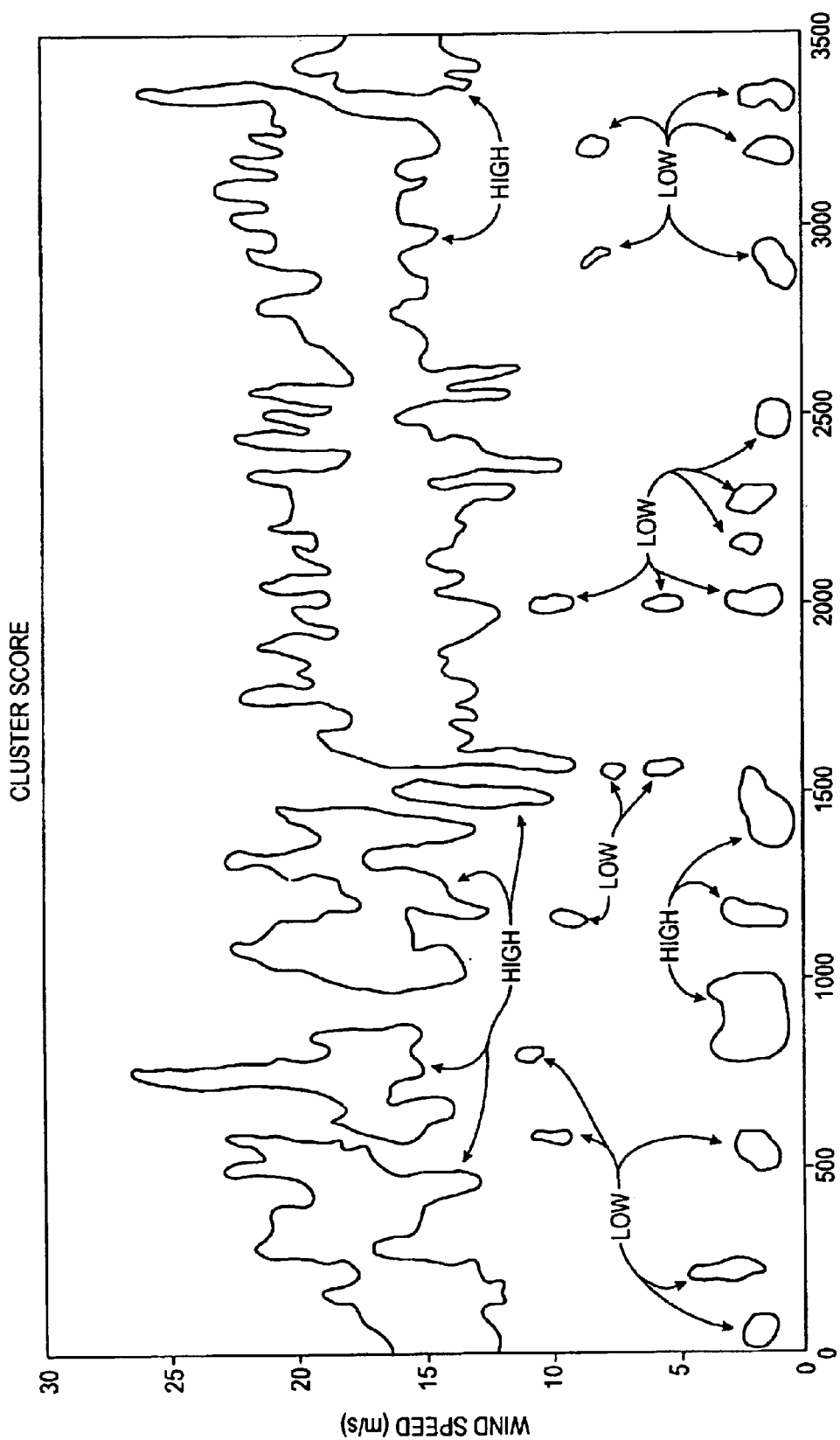
FIG. 16 illustrates cluster scoring in an example of the invention.

The CSI is a measure of how persistent a cluster is in both the histogram field and the median field. This CSI tends to downgrade the membership for in isolated points in the time series. For example, many of the points connecting the atmospheric data (around 15 meters per second) to the dropout feature at around 1 m/s in FIG. 3 will get a low CSI if such points happen to be in a cluster. These cluster tests help identify points that are in data sets (clusters) that are similar to the failure modes seen in FIG. 3 and FIG. 6. FIG. 16 illustrates an example of cluster scoring. The use of the CSI to score data points is an example of a "confidence" hypersurface.

Figure 17:
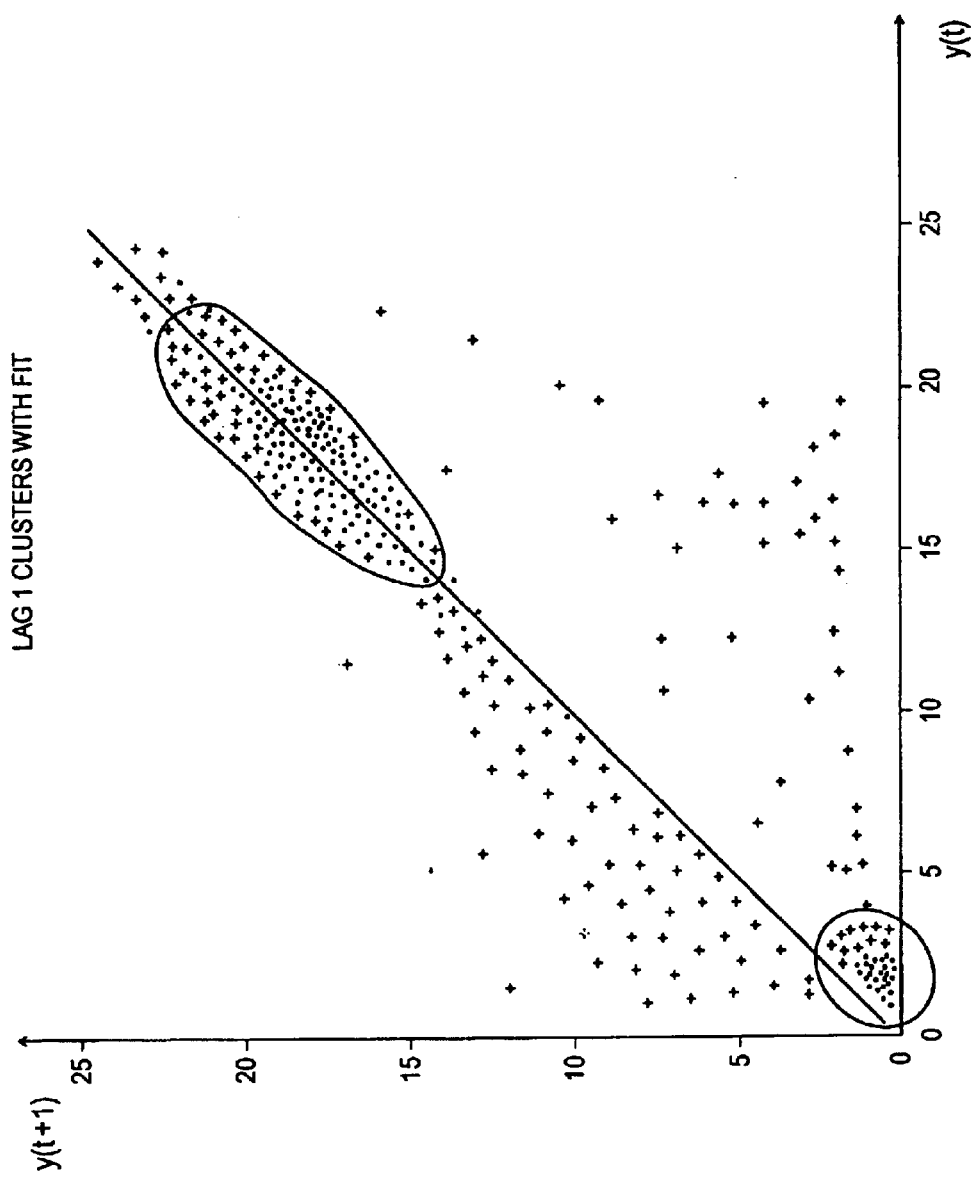
FIG. 17 illustrates clusters in an example of the invention.

The data in the clusters are then tested to see if they are locally stationary and well-correlated. To verify that the data in the histogram clusters satisfy the model assumption for atmospheric data, the scatter plot y(t) vs. y(t+1) is created (lag(1)). This is an example of an "atmospheric" hypersurface. The scatter plot of lag 1 for the loose nut case is shown in FIG. 17, where there are two distinct clusters, the atmospheric cluster centered near 18 m/s and the data drop out cluster centered near the origin can be seen. Note that the atmospheric cluster has a cluster type where the cluster exhibits a correlation to a geometric constraint—a line with its slope equal to one. The representation of each data point (dot=high and cross=low) is based on the geometric mean of the initial confidence for the points y(i) and y(i+h) given by:

$$C_{i+h} = \sqrt{C_i \cdot C_{i+h}}$$

The solid line is the confidence-weighted linear best fit to the data. Note that these lag clusters are found in the lag plot and are different from the clusters found in the histogram field. The same methods as used with the time series plot are now applied to the lag plot to find these clusters: histograms from a sequence of running overlapping windows in lag space are calculated and the corresponding clusters are determined. The contour threshold used in the initial clustering is then lowered and a new set of clusters are found. Once the clusters in the lag plot have been determined, fuzzy logic techniques are used to determine which cluster at which water level has the highest membership value. This cluster is the largest, highest-correlated large cluster in the data.

The lag clusters are scored, using fuzzy logic methods, according to the expected model (i.e. how well a line fits the data in the lag cluster). Assuming that the atmospheric data is stationary over the time window used, a least squares best fit of y(t) to y(t+1) is calculated:

$$L(y_t) = \mu + m(1) \cdot (y_t - \mu)$$

where:

$$\mu = E(i \, y_t)$$

(the expected value of y), and:

$$m(1) = \frac{E(y_{t+1} - \mu) \cdot (y_t - \mu)}{E(y_t - \mu)^2}$$

The residual $$R^2 = E(y_{t+1} - L(y_t))^2$$

$$R^2 = (1 - \rho^2(1)) E(y_t - \mu)^2$$

where:

$$\rho(h) = \frac{E(y_{t+h} - \mu) \cdot (y_t - \mu)}{\sqrt{E(y_{t+h} - \mu)^2} \sqrt{E(y_t - \mu)^2}}$$

$$\rho(h) = \frac{\Sigma(y_{i+h} - \mu_{i+h}) \cdot (y_i - \mu_i) \cdot C_{i,i+h}}{\sqrt{(y_{i+h} - \mu_{i+h})^2 \cdot C_{i,i+h}} \cdot \sqrt{(y_i - \mu_i)^2 \cdot C_{i,i+h}}}$$

$$\mu_i = \frac{\Sigma y_i \cdot C_{i,i+h}}{\Sigma C_{i,i+h}}$$

$$\mu_{i+h} = \frac{\Sigma y_{i+h} \cdot C_{i,i+h}}{\Sigma C_{i,i+h}}$$

Where a $\rho(h)$ value close to zero indicates a poor fit and a value near one indicates an excellent fit. In fact, $\rho$ represents the percent of variation in y(i+1) explained by the fit. Thus, in lag(1) space, pairs of points that are in the atmospheric data should be clustered around a line with a slope close to one. For instance, in FIG. 17 the data in the atmospheric cluster is more correlated than the data in the cluster near the origin. Namely, for lag 1, the slope of the confidence-weighted best fit is close to one hence there is a high degree of correlation, i.e. $\rho(\mathbf{1})$ is near one.

Figure 18:
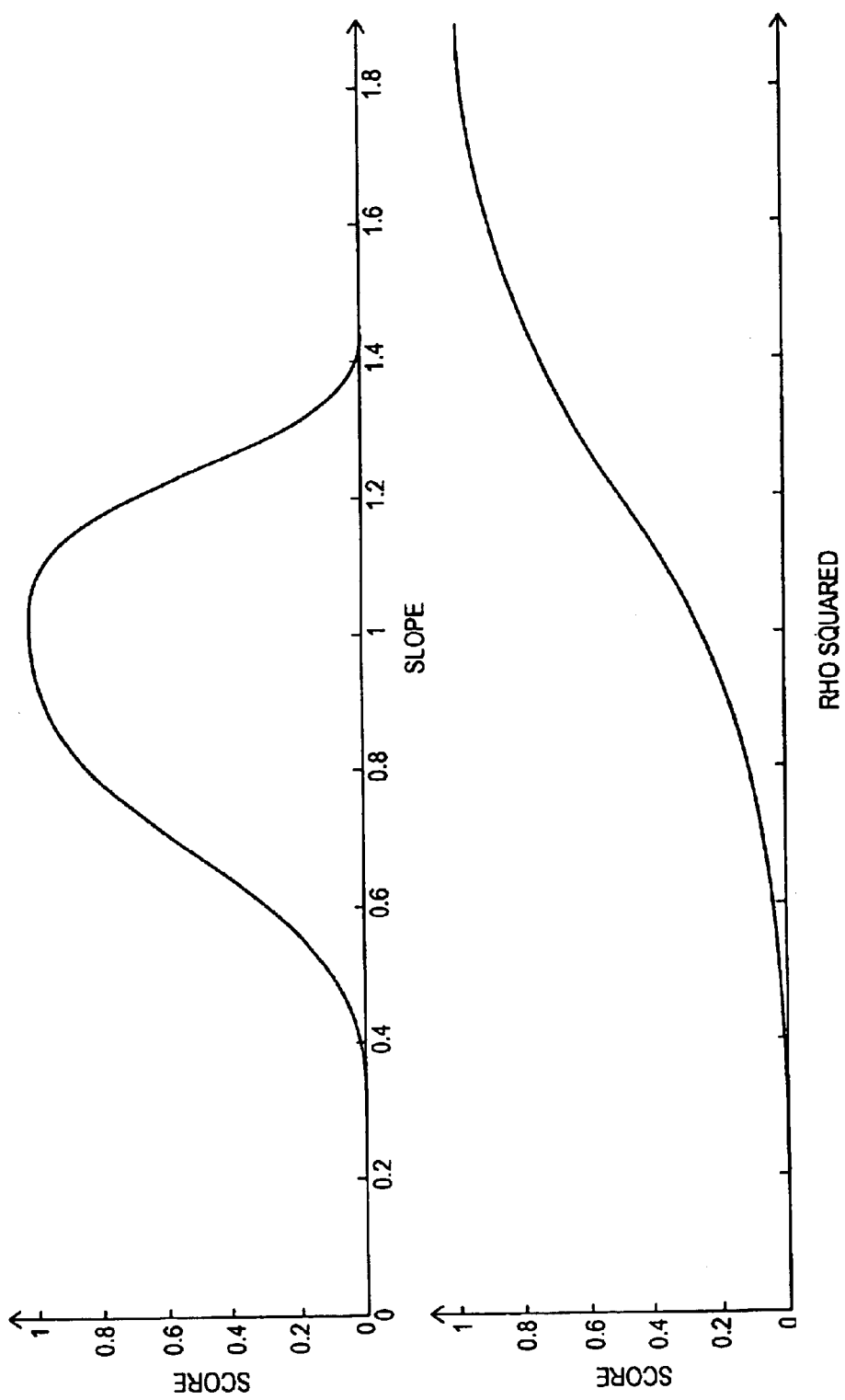
FIG. 18 illustrates membership functions in an example of the invention.

In the case of the lag clusters membership functions are defined for the value $\rho(\mathbf{1})$, FIG. 18 shows the membership functions for the lag cluster score, and if m(1) is close to 1 and $\rho(\mathbf{1})$ is near 1 the membership value should be large.

Figure 19:
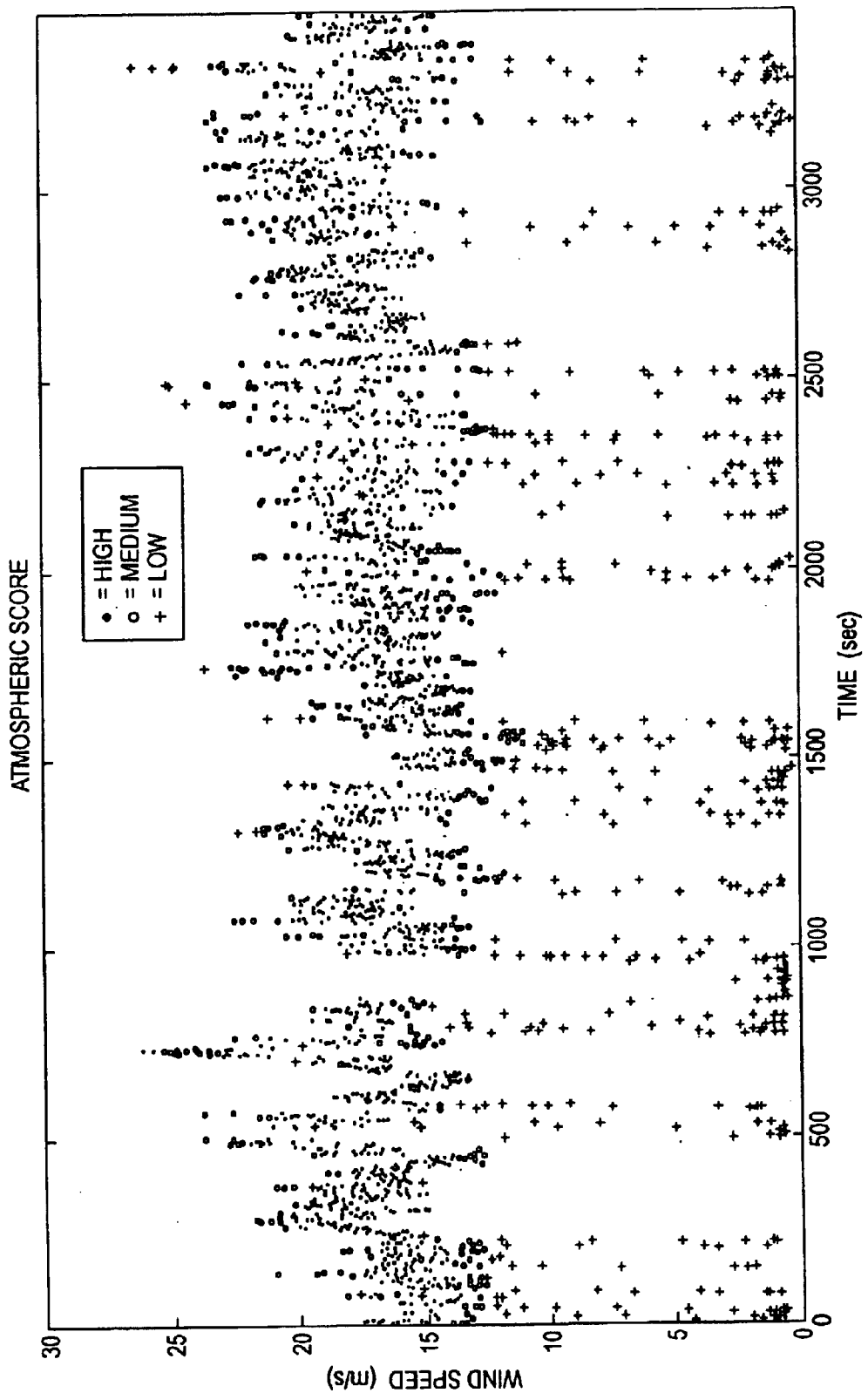
FIG. 19 illustrates atmospheric membership values in an example of the invention.

Conversely if $\rho(1)$ is small and $m(1)$ is small then the membership value should be small. The actual membership values represent another example of a hypersurface. As can be seen from FIG. 17 the clusters shown roughly compare to how a human might cluster the data, where the large cluster centered on 17 m/s has been given a high membership value and the one near the origin a small membership value. Once the atmospheric cluster has been found, an atmospheric membership value for each point can be calculated by evaluating how far the point is from the atmospheric cluster. In FIG. 17, almost all the points outside the atmospheric cluster are suspicious since they do not have the expected correlation structure. FIG. 19 is a representative time series plot of the atmospheric membership value for the data in FIG. 3. On FIG. 19, dots have a high membership value, circles have a medium membership value, and crosses have a low membership value. Those skilled in the art will appreciate that more granular representations than FIG. 19 are available by using color coding based on membership value.

Figure 20:
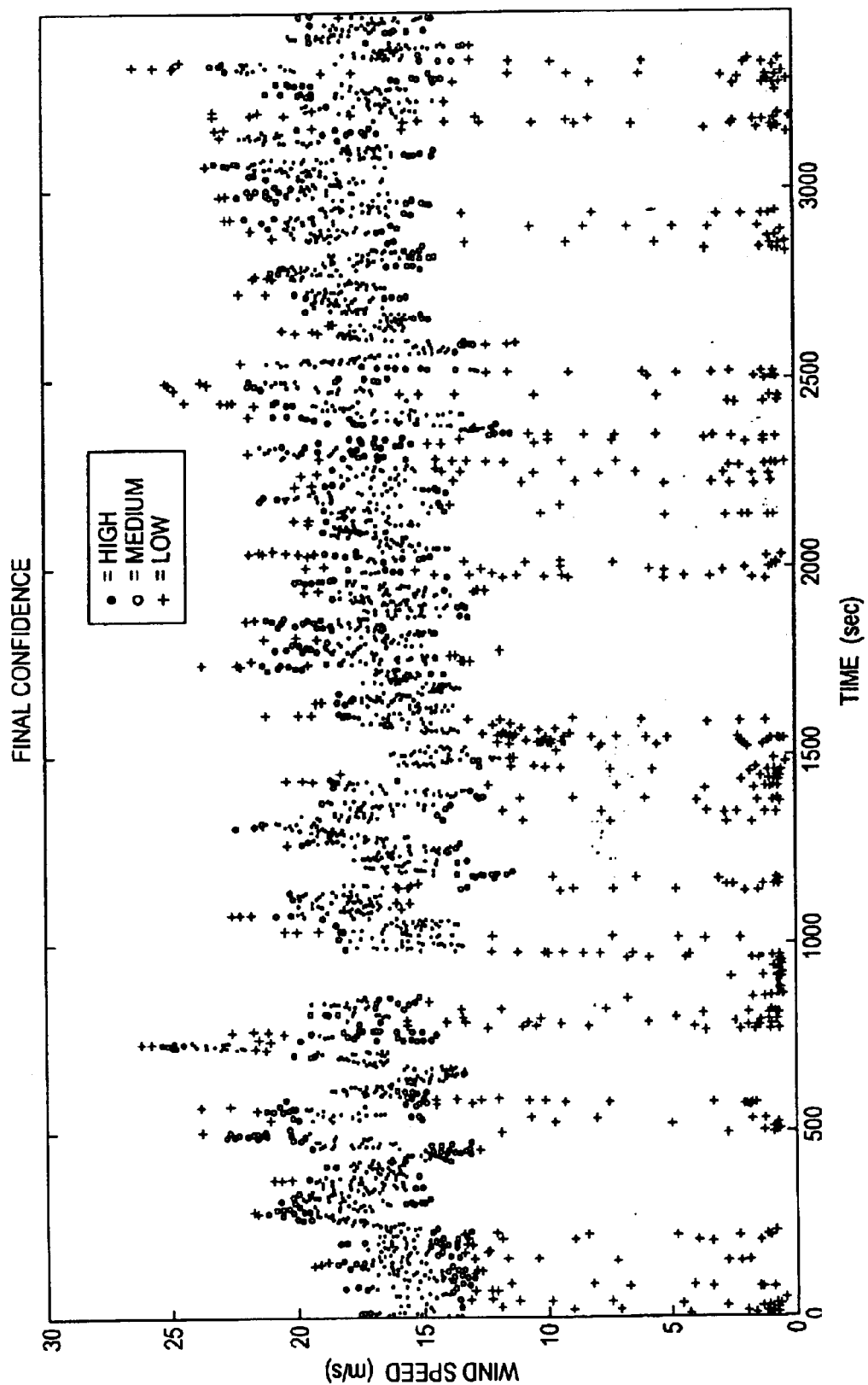
FIG. 20 illustrates combined membership values in an example of the invention.

One goal of IODA is to build a final feature for the data, i.e. combine the peak regions of FIG. 10 into a larger scale structure that spans the entire time interval. The trick is to include only good clusters and exclude the bad. In the histogram field shown in FIG. 10, both the good clusters (centered on 17 m/s) and the dropout clusters (near zero) appear as peak regions. Hence from an algorithmic perspective all the clusters in FIG. 10 are equal, and the problem of separating the good clusters form the bad can be difficult. However a combined membership value can be calculated (FIG. 20) which is a combination of all the membership values, i.e. the atmospheric membership value, the background membership value, the frozen membership value and the spurious membership value. On FIG. 20, dots have a high membership value, circles have a medium membership value, and crosses have a low membership value. Those skilled in the art will appreciate that more granular representations than FIG. 20 are available by using color coding based on membership value.

The combined membership values represent a composite hypersurface that is comprised of the hypersurfaces that were created from the time series data by their respective membership functions. Notice that the combined membership value correctly gives a low confidence to the data dropouts, and the spurious points that fall between the dropouts and the primary signal. Using the combined membership value, a final histogram field can be calculated in the usual way (a set of overlapping sub regions using a sequence of running windows is defined and a confidence weighted histogram is calculated for each data window, where the combined membership value is taken as the confidence.) The final histogram field is another example of a composite hypersurface. Final histogram clusters can be found in the final histogram field in the usual way, and do not suffer the problems of the clusters in the original histogram field, i.e. the dropout points in the final histogram field do not form peak regions. The task of finding a final feature in the final histogram field is much simpler than finding a feature in the original histogram field. In fact, recall, how as the water was lowered in the original histogram field clusters began to grow and coalesce together. A similar method can be employed in the final histogram field, however there will now be fewer (if any) clusters from failure mode data. In fact if final histogram clusters are significantly isolated then they probably do not belong to the same feature. If they did belong the same feature they would either have grown together, or should be near each other.

A human expert combines the clusters in FIG. 10 into a feature using several possible simple rules. The first rule is that there are a bunch of peak clusters that are centered on a common value (17 m/s), and all of these peak clusters overlap, e.g. the first big cluster ends near where the second big cluster begins. The same method is now used to classify a final feature, a final feature membership value is calculated as a function of how near a cluster is to its neighbors, i.e. does the cluster in question overlap the feature in question. Where the notion of a cluster overlapping a feature is calculated using a fuzzy logic algorithm: the mean value of the cluster in question is compared to the mean value of the feature. If the mean value of the candidate cluster is within some vicinity of the end of the feature then the candidate cluster overlaps the feature, and the candidate cluster is added to the feature. This final histogram field is another example of a composite hypersurface. The clusters in the final histogram field can now be strung together in a manner similar to how a human would group them to classify a final feature that spans the entire data set.

Figure 21:
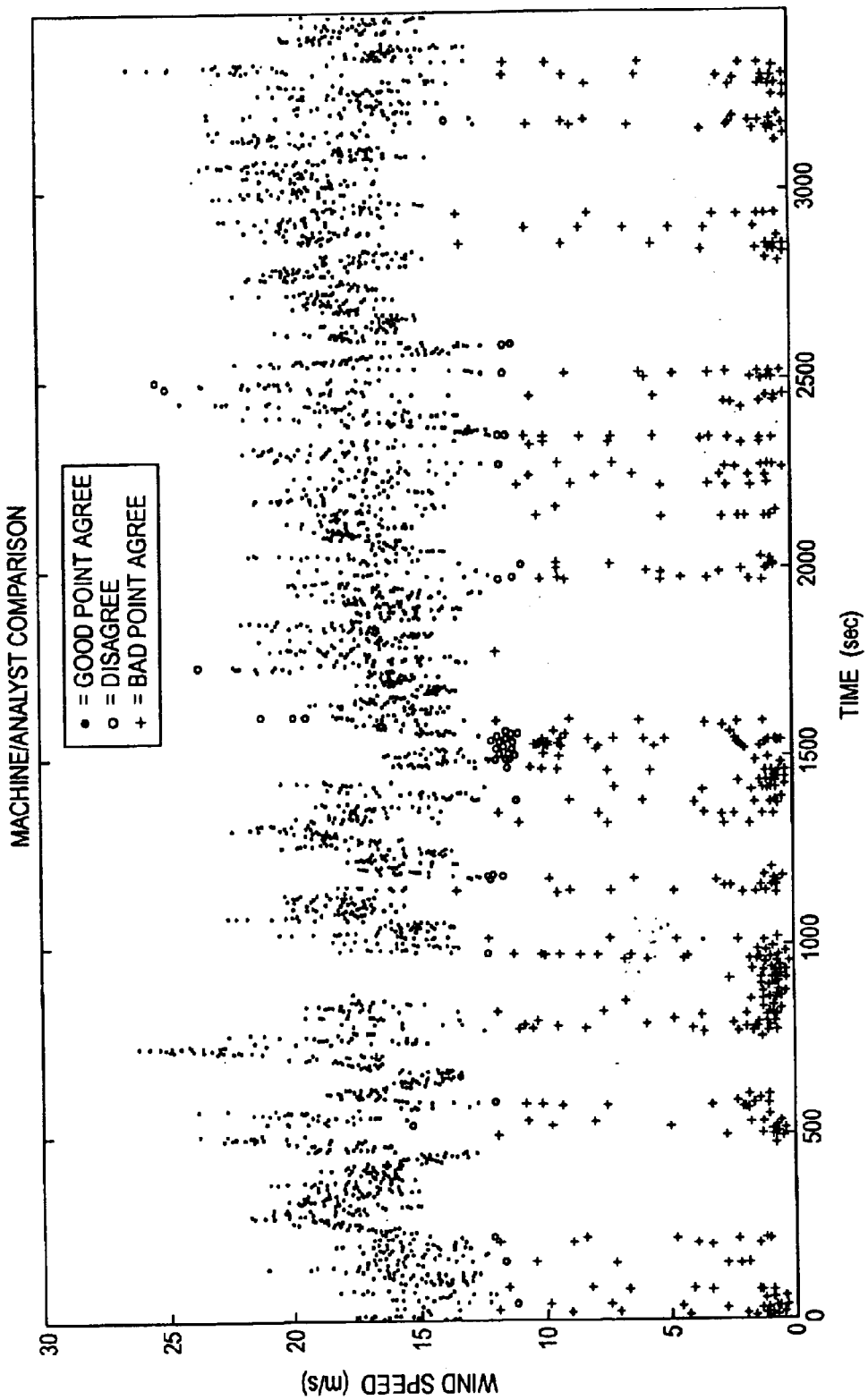
FIG. 21 illustrates confidence values in an example of the invention.

FIG. 21 shows a set of data points processed by both the IODA algorithm and an expert human analyst. The dots show where both the human and the algorithm agree that the data point is legitimate atmospheric data. The cross show where both the human and the algorithm agree that the data point is not legitimate atmospheric data. The circles show where the human and the algorithm disagree regarding the data point. FIG. 21 demonstrates the effectiveness of the IODA algorithm by showing that the human expert and the IODA algorithm agree on the vast majority of data points.

From the above description, those skilled in the art will appreciate that the IODA algorithm can: 1) process time series data with a plurality of membership functions to generate a plurality of hypersurfaces, 2) process the hypersurfaces to generate a composite hypersurface, 3) process the composite hypersurface to identify clusters, and 4) process the clusters to classify a feature in the time series data. Time series data has at least one parameter that varies over time. For example, wind speed is a parameter that varies over time. A membership function is an algorithm, equation, or technique that operates on the time series data to produce a membership value that indicates a level of membership in a membership class. The membership value may be generated as a value from zero to one where higher membership values represent stronger levels of membership in the class. For example, a histogram membership function assesses data density, and a membership value of 0.9 would indicate that a given data point is in a dense data field. Various membership functions may be used to simultaneously assess multiple membership classes.

The membership values generated by a membership function are mapped to the time series data form a membership field—referred to as a hypersurface. With single-parameter data that varies over time, the hypersurface can be thought of as a third dimension (height) that forms a topology above the flat two-dimensional array of the parameter and time. The same concept is valid with multi-parameter data, although the hypersurface is harder to visualize because it represents an Nth dimension where N>3. The hypersurfaces are combined to form a composite hypersurface. Often, the hypersurfaces are normalized and weighted to effect the proper combination.

The composite hypersurface is processed to identify clusters. One technique for cluster identification is enclosing composite hypersurface values that meet or exceed a threshold—referred to as contouring. If desired, the threshold may be reduced and surface values that meet or exceed the lower threshold may be enclosed to form another cluster. Thus, the threshold may be raised and lowered to generate various clusters at various threshold levels. There are other known clustering techniques.

The clusters are processed to classify a desired feature. For example, the desired feature may be the true atmospheric signal (i.e. wind speed) that is represented in the time series data along with undesirable spurious data and failure mode data. Expected cluster types are modeled to assist in feature classification. For example, the time series data from a failing anemomonitor may exhibit a specific type of failure mode cluster type that can be modeled a priori and identified during subsequent processing. The time series data for the desired feature may exhibit cluster types with specific and expected temporal correlations.

The time series data is then assessed in relation to the feature and possibly other factors to generate feature membership values that indicate levels of feature membership for the time series data. This assessment may repeat some of the above processing: processing the time series data in the feature with a plurality of membership functions to generate a plurality of hypersurfaces, processing the hypersurfaces to generate a composite hypersurface, processing the composite hypersurface to identify clusters, and processing the clusters to provide the feature membership values. The feature membership values could be also obtained directly from the composite hypersurface. The feature membership values may be normalized to values from zero to one.

Figure 22:
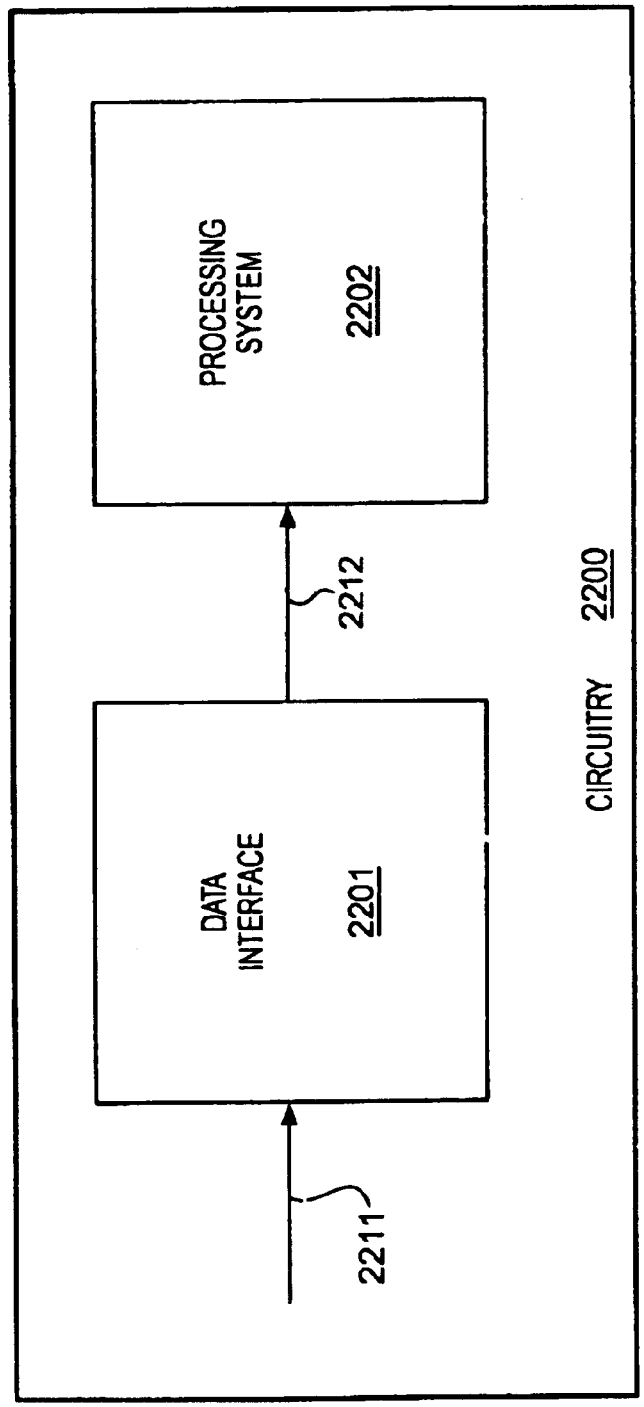
FIG. 22 illustrates circuitry in an example of the invention.
Figure 23:
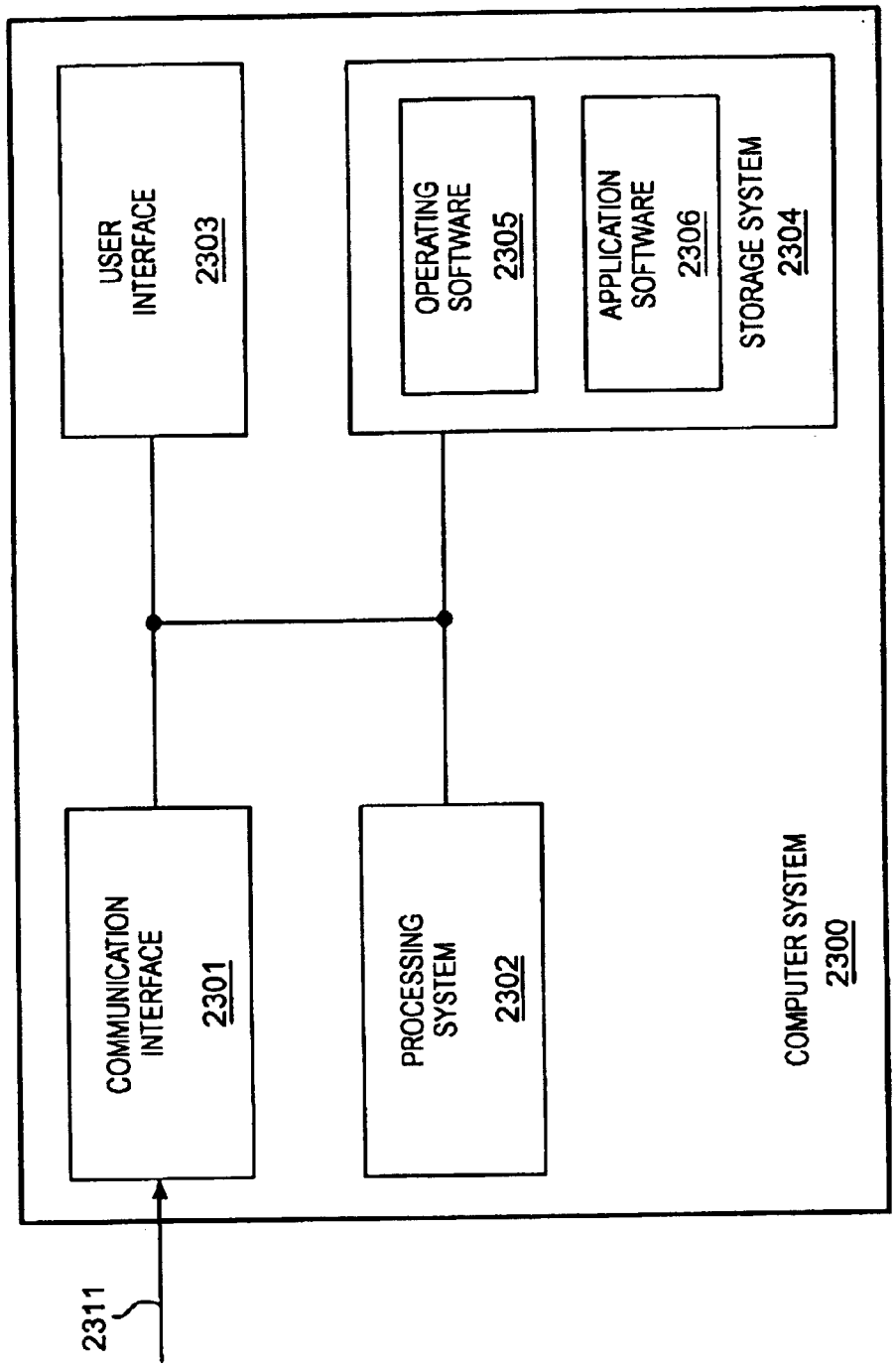
FIG. 23 illustrates a computer system in an example of the invention.
Figure 24:
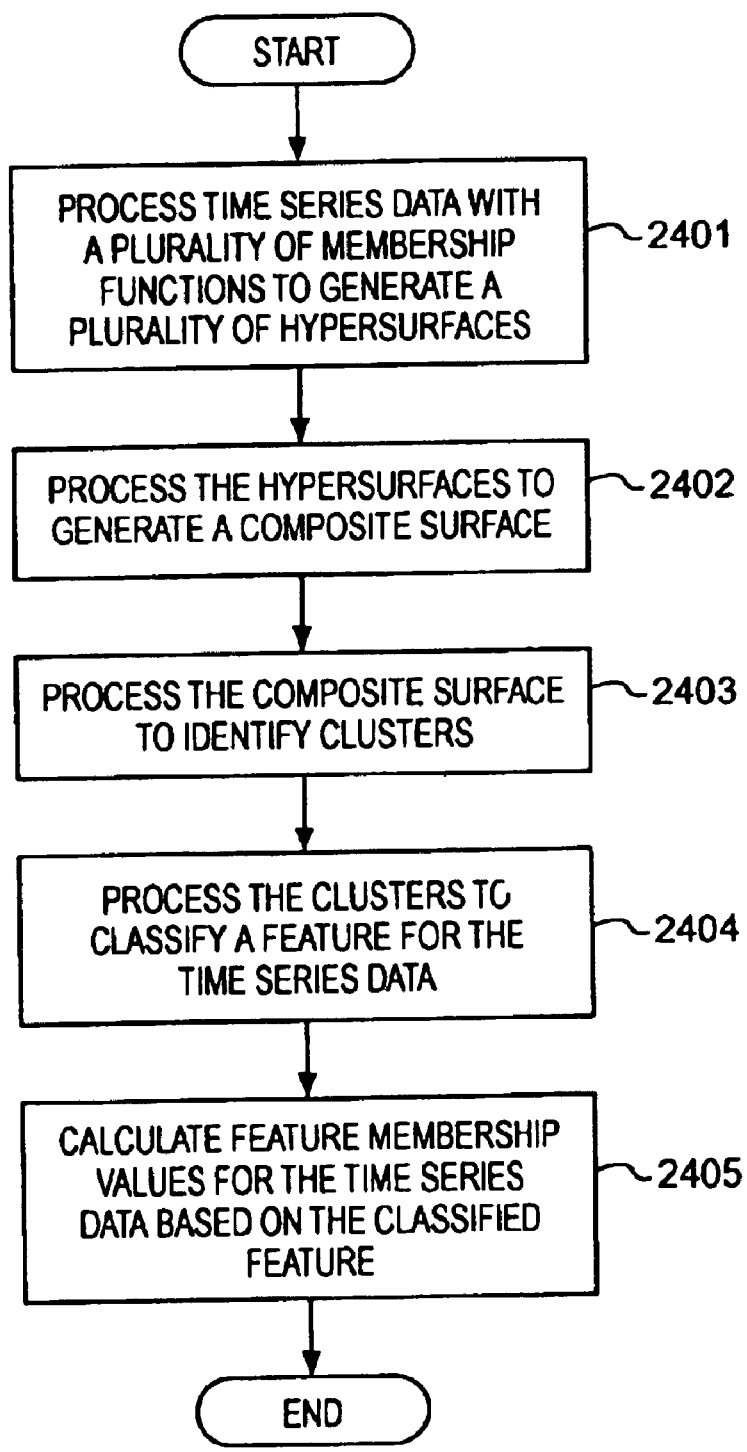
FIG. 24 illustrates processing system operation in an example of the invention.

Feature Classification Circuitry and Software—FIGS. 22–24

FIG. 22 illustrates circuitry 2200 in an example of the invention. Circuitry 2200 could be configured from an integrated circuit or a set of integrated circuits. Examples of such integrated circuits include but are not limited to general-purpose processors, digital signal processors, and application specific integrated circuits. Circuitry 2200 comprises data interface 2201 and processing system 2202. Data interface 2201 receives signal 2211 from circuitry 2200 and/or external systems. Signal 2211 indicates time series data 2212. Data interface 2201 transfers time series data 2212 from signal 2211 to processing system 2202. Processing system 2202 operates as indicated with respect to FIG. 24 (described below) to classify a feature in time series data 2212.

FIG. 23 illustrates computer system 2300 in an example of the invention. Computer system 2300 includes communication interface 2301, processing system 2302, user interface 2303, and storage system 2304. Storage system 2304 stores operating software 2305 and application software 2306. Processing system 2302 is linked to communication interface 2301, user interface 2303, and storage system 2304. Computer system 2300 could be comprised of a programmed general-purpose computer, although those skilled in the art will appreciate that programmable or special purpose circuitry and equipment may be used. Computer system 2300 may use a client server architecture where operations are distributed among a server system and client devices that together comprises elements 2301–2306.

Communication interface 2301 could comprise a network interface card, modem, port, or some other communication device. Communication interface 2301 may be distributed among multiple communication devices. Processing system 2302 could comprise a computer microprocessor, logic circuit, or some other processing device. Processing system 2302 may be distributed among multiple processing devices. User interface 2303 could comprise a keyboard, mouse, voice recognition interface, microphone and speakers, graphical display, touch screen, or some other type of user device. Storage system 2304 could comprise a disk, tape, integrated circuit, server, or some other memory device. Storage system 2304 may be distributed among multiple memory devices.

Processing system 2302 retrieves and executes operating software 2305 and application software 2306 from storage system 2304. Operating software 2305 may comprise an operating system, utilities, drivers, networking software, and other software typically loaded onto a general-purpose computer. Application software 2306 could comprise an application program, firmware, or some other form of machine-readable processing instructions. When executed by processing system 2302, application software 2306 directs processing system 102 to operate in accord with FIG. 24 (described below). Processing system 2302 receives time series data 2321 through communication interface 2303. Processing system 2302 classifies a feature in time series data 2212.

FIG. 24 illustrates operation for processing systems 2202 and 2302 in an example of the invention. This operation may implement various aspects of the IODA algorithm described above. The reference numbers from FIG. 24 are indicated parenthetically.

The processing system processes time series data with a plurality of membership functions to generate a plurality of hypersurfaces (2401). The hypersurfaces could indicate density of the time series data, confidence values for the time series data, or some other factor of interest. The processing system processes the hypersurfaces to generate a composite hypersurface (2402). The height scale for the composite hypersurface and/or the hypersurfaces could be from zero to one. The processing system processes the composite hypersurface to identify clusters (2403). This processing could entail contouring the composite hypersurface to form the clusters. If desired, the processing system may also process some of the hypersurfaces to identify some of the clusters.

The processing system processes the clusters to classify a feature for the time series data (2404). This processing could entail classifying the clusters based on a plurality of cluster types and constructing the feature from the clusters based on the cluster classifications. Some examples of cluster types include atmospheric cluster types and failure mode cluster types. The processing system calculates feature membership values for the time series data based on the classified feature (2405). If desired, the processing system may also produce a valid set of the time series data for the desired feature based on the feature membership values.

Implementations

There are numerous variations and implementations for the invention in addition to those described above. In many cases, the invention can be used as a front-end to current data processing systems where the invention cleans up time series data that may become too contaminated for the current data processing systems to handle.

Some examples of the invention could be applied to feature detection in spatial images, such as a time series of two dimensional satellite images. The images may include visual or infrared frequencies. The feature could include short time changes (such as detecting a volcanic eruption) or longer time changes (such as tracking a volcanic ash plume).

Some examples of the invention could be applied to detect malfunctions in robust control systems, especially where the field equipment that is subject to failure is located in a hostile or inaccessible environment. Examples of the invention could be used to detect a malfunctioning temperature sensor in a nuclear reactor.

Some examples of the invention could be applied to separate signals having overlapping distributions. Examples of the invention could be used to separate communication signals from one another and/or from contaminating signals. Examples of the invention could be applied to a speech recognition system to separate speech signals from one another and/or from contaminating signals.

Some examples of the invention could be applied to detect electronic fraud. Examples of the invention could be used to detect the illegitimate use of account numbers, passwords, user names, and other data.

Some examples of the invention could be applied to digital video processing. Examples of the invention could be used to remove halos when different sets of video data are combined to generate a single video image.

Some examples of the invention could be applied to medical data processing. Examples of the invention could be used to analyze time sequenced images, such as X-rays, magnetic resonance images, and cat scans, to detect medical conditions or failing equipment.

Some examples of the invention could be applied to chemical analysis. Examples of the invention could be used to detect the presence of a specific chemical based on time series sensor data.

Some examples of the invention could be applied to computer vision. Examples of the invention could be used to process data from optical sensors in robotic systems.

Some examples of the invention could be applied to surveillance systems. Examples of the invention could be used to identify specific features surveillance camera images.

Some examples of the invention could be applied to atmospheric systems. Examples of the invention could be used to identify gust front boundaries in radar images.

What is claimed is:

1. A method of operating a processing system to classify a feature in time series data, the method comprising:
   processing the time series data to generate a plurality of hypersurfaces;
   processing the hypersurfaces with a plurality of membership functions to identify a plurality of clusters and to classify the clusters into a plurality of cluster tapes;
   processing the clusters from one of the cluster types to construct the feature; and
   classifying the feature.

2. The method of claim 1 wherein processing the hypersurfaces to identify the clusters comprises contouring the hypersurfaces to form the clusters.

3. The method of claim 1 wherein the cluster types comprise an atmospheric cluster type.

4. The method of claim 1 wherein the cluster types comprise a failure mode cluster type.

5. The method of claim 1 further comprising calculating feature membership values for the time series data based on the classified feature.

6. The method of claim 5 further comprising detecting outliers in the time series data based the feature membership values.

7. The method of claim 5 wherein the feature membership values indicate confidence values for the time series data.

8. The method of claim 1 wherein the hypersurfaces have a height scale from zero to one.

9. The method of claim 1 wherein processing the hypersurfaces with the membership functions to identify the clusters comprises:
   processing the hypersurfaces to generate a composite hypersurface; and
   processing the composite hypersurface to identify the clusters.

10. A system to classify a feature in time series data, the system comprising:
    an interface configured to receive the time series data; and
    a processing system configured to process the time series data to generate a plurality of hypersurfaces, process the hypersurfaces with a plurality of membership functions to identify a plurality of clusters and to classify the clusters into a plurality of cluster types, process the clusters from one of the cluster types to construct the feature, and classify the feature.

11. The system of claim 10 wherein the processing system is configured to contour the hypersurfaces to form the clusters.

12. The system of claim 10 wherein the cluster types comprise an atmospheric cluster type.

13. The system of claim 10 wherein the cluster types comprise a failure mode cluster type.

14. The system of claim 10 wherein the processing system is configured to calculate feature membership values for the time series data based on the classified feature.

15. The system of claim 14 wherein the processing system is configured to detect outliers in the time series data based the feature membership values.

16. The system of claim 14 wherein the feature membership values indicate confidence values for the time series data.

17. The system of claim 10 wherein the hypersurfaces have a height scale from zero to one.

18. The system of claim 10 wherein:
    the processing system is configured to process the hypersurfaces to generate a composite hypersurface, and process the composite hypersurface to identify the clusters.

19. A software product to classify a feature in time series data, the software produce comprising:
    application software configured to direct a processing system to process the time series data to generate a plurality of hypersurfaces, process the hypersurfaces with a plurality of membership functions to identify a plurality of clusters and to classify the clusters into a plurality of cluster types, process the clusters from one of the cluster types to construct the feature, and classify the feature; and
    a storage system that stores the application software.

20. The software product of claim 19 wherein the application software is configured to direct the processing system to contour the hypersurfaces to form the clusters.

21. The software product of claim 19 wherein the cluster types comprise an atmospheric cluster type.

22. The software product of claim 19 wherein the cluster types comprise a failure mode cluster type.

23. The software product of claim 19 wherein the application software is configured to direct the processing system to calculate feature membership values for the time series data based on the classified feature.

24. The software product of claim 23 wherein the application software is configured to direct the processing system to detect outliers in the time series data based the feature membership values.

25. The software product of claim 23 wherein the feature membership values indicate confidence values for the time series data.

26. The software product of claim 19 wherein the hypersurfaces have a height scale from zero to one.

27. The software product of claim 19 wherein:
    the application software is configured to direct the processing system to process the hypersurfaces to generate a composite hypersurface, and process the composite hypersurface to identify the clusters.

* * * * *